(12) United States Patent
Wilson et al.

(10) Patent No.: US 7,520,213 B2
(45) Date of Patent: *Apr. 21, 2009

(54) BALE MOISTENING AND HANDLING APPARATUS AND METHOD

(75) Inventors: Robert James Wilson, Hillsburgh (CA); William Charles Cecil Upshall, Hillsburgh (CA)

(73) Assignee: Gilbrea Consulting Ltd., Hillsburgh, Ontario (CA)

( * ) Notice: Subject to any disclaimer, the term of this patent is extended or adjusted under 35 U.S.C. 154(b) by 547 days.

This patent is subject to a terminal disclaimer.

(21) Appl. No.: 11/000,933

(22) Filed: Dec. 2, 2004

(65) Prior Publication Data

US 2005/0076796 A1   Apr. 14, 2005

Related U.S. Application Data

(63) Continuation-in-part of application No. 10/140,367, filed on May 8, 2002, now Pat. No. 6,837,154.

(51) Int. Cl.
*B66C 23/18* (2006.01)
(52) U.S. Cl. .................. 99/534; 99/536; 414/665; 426/636
(58) Field of Classification Search ............. 99/534, 99/536, 516; 414/665, 812; 426/636
See application file for complete search history.

(56) References Cited

U.S. PATENT DOCUMENTS

| 1,513,174 | A | 10/1924 | Kruger |
|---|---|---|---|
| 3,968,940 | A | 7/1976 | Godbersen |
| 4,024,970 | A | 5/1977 | Schirer |
| 4,053,069 | A | 10/1977 | Love |
| 4,091,943 | A * | 5/1978 | Bay-Schmith ............ 414/812 |
| 4,095,706 | A | 6/1978 | Schwien et al. |
| 4,182,780 | A | 1/1980 | Lagerstrom |
| 4,363,583 | A | 12/1982 | Bontrager |
| 4,498,829 | A | 2/1985 | Spikes et al. |
| 4,606,172 | A | 8/1986 | Miller |
| 4,614,476 | A | 9/1986 | Mello Ribeiro Pinto |
| 4,627,338 | A | 12/1986 | Sprott et al. |
| 5,725,346 | A | 3/1998 | Davina |
| 5,789,072 | A | 8/1998 | Ulrich |

(Continued)

FOREIGN PATENT DOCUMENTS

CA   1234313   4/1988

(Continued)

*Primary Examiner*—Reginald L Alexander
(74) *Attorney, Agent, or Firm*—Fasken Martineau Dumoulin LLP

(57) ABSTRACT

The present invention relates to an apparatus and method for moistening and handling at least one bale. The apparatus includes an open-topped tank for containing a liquid for moistening the at least one bale, a base and a mast assembly extending upwardly from the base. The mast assembly is rotatable about its longitudinal axis. The apparatus further includes a boom carried by the mast assembly. The boom is moveable between a lowered position and a raised position relative to the base. There is also provided a bale gripping device that depends from the boom. The bale gripping device includes a bale guide for maintaining the at least one bale engaged in a submerged position within the tank to facilitate moistening of the at least one bale. A method of moistening and handling at least one bale is also disclosed.

73 Claims, 30 Drawing Sheets

U.S. PATENT DOCUMENTS 6,837,154 B2    1/2005    Wilson

FOREIGN PATENT DOCUMENTS

| CA | 2082504 | 6/1991 |
| CA | 2132322 | 3/1993 |
| CA | 2096045 | 5/1993 |
| CA | 2166476 | 7/1994 |
| CA | 2212918 | 8/1997 |
| CA | 2226913 | 1/1998 |
| DE | 88 04 301.0 | 6/1988 |
| DE | 3907008 | 9/1990 |
| FR | 1057227 | 3/1954 |
| GB | 2220637 | 1/1990 |
| GB | 2238036 | 5/1991 |

* cited by examiner

BALE MOISTENING AND HANDLING APPARATUS AND METHOD

RELATED APPLICATION

This application is a continuation-in-part of U.S. patent application Ser. No. 10/140,367 filed May 8, 2002, now issued to U.S. Pat. No. 6,837,154; the disclosure of which is hereby incorporated by reference.

FIELD OF THE INVENTION

The present invention relates to an apparatus and method for moistening and handling bales.

BACKGROUND OF THE INVENTION

Before hay or similar feed is distributed to livestock, it may be preferable to moisten or treat the feed with water or a conditioning liquid. The primary reason for moistening hay prior to feeding is to reduce or eliminate the dust that is commonly found in hay. This dust can cause very serious respiratory problems in livestock, especially in horses. In addition, this moistening, treating, or conditioning may make the feed more appetizing to livestock A traditional means of moistening, treating, or conditioning hay has been to pour or spray a desired liquid onto the unbaled or baled hay before it is distributed to livestock feeding areas. However, the process used for spraying or pouring is imprecise, labour intensive, time consuming, and inconvenient. Often liquid is wasted or more than the required amount is added to compensate for the wasted amounts. If the hay remains baled during the process, labour intensity and inconvenience are substantial as the weight of a bale will greatly increase upon moistening. This is especially so if the moistening and handling of moistened bales are to be conducted indoors as well as outdoors. Therefore, a means is required for moistening, treating, or conditioning baled feed which reduces waste and can be carried out at a convenient place and time, such as during bale handling prior to distribution to livestock located indoors or outdoors.

Devices for moistening, treating, or conditioning bales are known. For example, liquids may be injected into bales. An injection probe is employed for this purpose in Canadian Patent. No. 1,234,313, issued Mar. 22, 1988, to Akins. Injecting spikes are used for the same purpose in U.S. Pat. No. 4,606,172, issued Aug. 19, 1986, to Miller and in U.S. Pat. No. 5,789,072, issued Aug. 4, 1998, to Ulrich. Similarly, devices for spray injecting liquids into bales are also known. For example, jet-forming nozzles are employed in U.S. Pat. No. 4,627,338, issued Dec. 9, 1986, to Sprott and Rotz and in Canadian Patent Application No. 2,082,504, filed May 6, 1991, by Carlson and Stockel. Moreover, devices for sprinkling baled material from above and for pouring liquids into bales are also known. For example, reference may be made to U.S. Pat. No. 4,182,780, issued Jan. 8, 1980, to Lagerstrom and Nilsson and to German Patent No. 3,907,008A1, published Sep. 6, 1990, by Dues.

Furthermore, devices for submerging baled material in a liquid are also known. For example, reference may be made to Canadian Patent Application No. 2,132,322, filed on Mar. 18, 1993, by Stockel and Carlson and to Canadian Patent Application No. 2,166,476, filed on Jul. 19, 1994, by Stockel and Carlson. The bale moistening device disclosed in these patents, while intended to be deployed outdoors, are not easily deployed indoors. None of these patents provide a simple and convenient method of moistening, conditioning, or treating bales, while conserving the conditioning liquid.

Another known bale submerging device is shown in German Patent No. 88 04 301.0 issued Jun. 30, 1988 to Kegel. This device employs a manually operated, parallelogram-type arrangement for raising and lowering bales into a container filled with a liquid. The bales are supported on a submergible platform. The device is designed to dunk bales into the container but it is not particularly well suited for otherwise handling bales, i.e. moving bales from one location to another.

In addition, devices for bale handling are described in U.S. Pat. No. 5,725,346, issued Mar. 10, 1998, to Davina, U.S. Pat. No. 4,498,829, issued Feb. 12, 1985, to Spikes and U.S. Pat. No. 4,363,583, issued Dec. 14, 1982, to Bontrager. The bale handing devices disclosed in these patents are employed to load a bale carrying truck or similar bale mover. These devices are not specifically designed for moistening bales or for the simple and convenient handling of moistened bales both indoors and outdoors.

Although the patents referred to above relate to either bale moistening or bale handling, none of these patents disclose a simple and convenient apparatus for performing the combined function of moistening and handling bales.

A need therefore exists for a simple and convenient bale moistening and handling apparatus which overcomes the problems inherent in the use of existing devices and methods.

SUMMARY OF THE INVENTION

According to a broad aspect of the present invention, an apparatus for moistening and handling at least one bale has an open-topped tank for containing a liquid for moistening the at least one bale, a base, and a mast assembly extending upwardly from the base. The mast assembly is rotatable about its longitudinal axis. The apparatus further includes a boom carried by the mast assembly. The boom is moveable between a lowered position and a raised position relative to the base. There is also provided a bale gripping device which depends from the boom. The bale gripping device includes a bale guide for maintaining the at least one bale engaged in a submerged position within the tank to facilitate moistening of the at least one bale.

In an additional feature, the mast assembly includes an inner mast portion and an outer mast portion concentrically mounted about the inner mast portion. The outer mast portion is slideably moveable relative to the inner mast portion along the longitudinal axis of the mast assembly. The boom is mounted to the outer mast portion. In a further feature, the outer mast portion is telescopically mounted to the inner mast portion.

In another feature, the apparatus has a first actuator to urge the outer mast portion to slide relative to the inner mast portion, and a second actuator to urge the mast assembly to rotate about its longitudinal axis. In an additional feature, the first actuator is disposed within the mast assembly. Moreover, the first actuator is pneumatic in nature. Further still, the first actuator includes a pneumatic piston having a cylinder disposed within the inner mast portion and a piston rod extending from the cylinder and attaching to the outer mast portion for imparting longitudinal motion to the outer mast portion when the pneumatic piston is actuated. In another feature, the second actuator is pneumatic in nature. Additionally, the second actuator includes a swing drive assembly connected to the inner mast portion, and a pneumatically powered motor for driving the swing drive assembly. The swing drive assembly and the pneumatically powered motor are housed within the base.

In another feature, the at least one bale is generally rectangular and has plurality of sides. The bale gripping device is configured so as to abut at least three sides of the rectangular bale.

In yet another feature, the bale gripping device includes a pair of first and second, opposed, gripping arm assemblies. The bale guide is disposed between the first and second gripping arm assemblies. In an additional feature, the bale guide is moveable relative to said boom. Moreover, the boom has a longitudinal axis and the bale guide is adapted to travel longitudinally along the boom. Additionally, the bale guide includes at least one guide plate carried by one of the gripping arm assemblies. In a further feature, the bale guide includes a pair of first and second guide plates each mounted to the respective first and second gripping arm assemblies.

In still another feature, the first gripping arm assembly is moveable relative to the boom. Additionally, the first gripping arm assembly includes a slide block for placement within the boom and a bracket depending from the slide block. The bracket has a proximal end connected to the slide block and a free end. The first gripping arm assembly also includes a gripping member mounted to the free end of said bracket. In a further feature, the bale guide includes a guide plate for abutting a top surface of the at least one bale. The guide plate is carried by the bracket.

In an additional feature, the apparatus includes an actuator disposed within the boom for urging the slide block to move in relation to the boom. The actuator is pneumatic in nature. Additionally, the actuator includes a pneumatic piston having a cylinder and a piston rod extending from the cylinder. The cylinder is mounted to the slide block and the piston rod is attached to the second gripping arm assembly.

According to another aspect of the present invention, an apparatus for moistening and handling at least one bale has an open-topped tank for containing a liquid for moistening the at least one bale, a base, a mast assembly extending upwardly from the base, and a boom carried by the mast assembly. The boom is rotatable about the mast assembly and is moveable between a lowered position and a raised position relative to the base. The apparatus further includes a bale gripping device which depends from the boom. The bale gripping device includes a bale guide for maintaining the at least one bale engaged in a submerged position within the tank to facilitate moistening of the at least one bale.

According to yet another aspect of the present invention, a method of handling and moistening at least one bale is provided. The method includes: providing a base, a mast assembly extending upwardly from the base, a boom carried by the mast assembly and a bale gripping device depending from the boom; the bale gripping device including a pair of gripping members and a bale guide; providing an open-topped tank for containing a liquid for moistening the at least one bale; gripping the at least one bale located at a first position, between the pair of gripping members; moving the boom along the longitudinal axis of the mast assembly to alternatively raise or lower the at least one bale relative to the base; rotating the boom about the longitudinal axis of the mast assembly to move the at least one bale from the first position to a second position located above the open-topped tank; lowering the at least one bale into the open-topped tank; maintaining the at least one submerged in the tank with the bale guide; and removing the at least one bale from the open-topped tank.

In an additional feature, the at least one bale is generally rectangular and has a plurality of sides, and gripping the at least one bale includes urging the bale gripping device to abut at least three sides of the at least one bale. Moreover, gripping the bale includes urging the bale guide to abut the top of the at least one bale. Additionally, gripping the bale includes actuating at least one of the gripping members to grippingly engage the at least one bale. Further still, gripping the bale includes actuating both gripping members simultaneously to grippingly engage the at least one bale.

BRIEF DESCRIPTION OF THE DRAWINGS

The embodiments of the present invention shall be more clearly understood with reference to the following detailed description of the embodiments of the invention taken in conjunction with the accompanying drawings, in which.

DETAILED DESCRIPTION OF THE PREFERRED EMBODIMENTS

Figure 1:
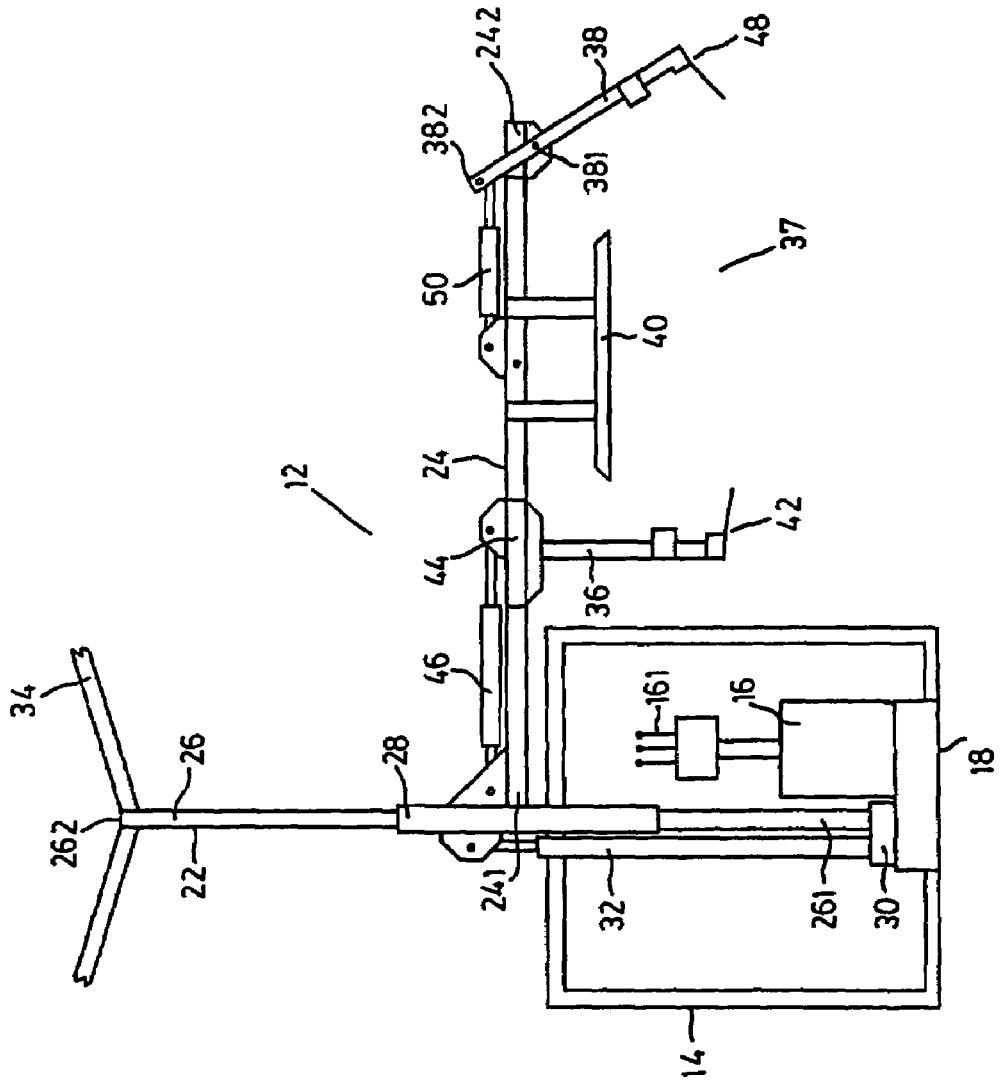
FIG. 1 is a front view illustrating a bale moistening and handling apparatus in accordance with an embodiment of the invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Figure 2:
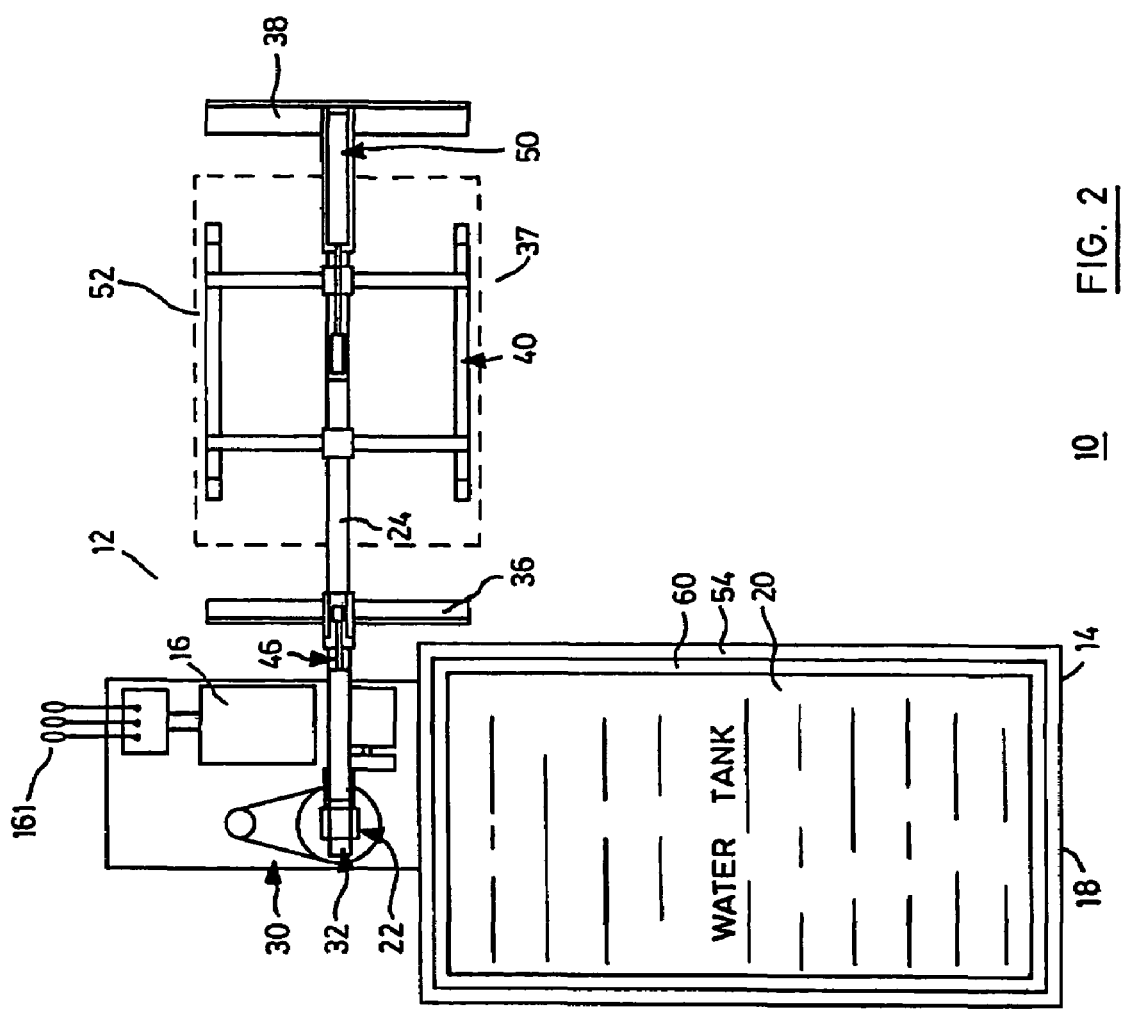
FIG. 2 is a top view of the apparatus of FIG. 1.

Referring to FIGS. 1 and 2, there are shown respective front and top views of a bale moistening and handling apparatus 10 according to an embodiment of the invention. The apparatus 10 includes a bale handler 12, a bale moistening tank 14, and control means 16 each of which may be mounted on a common base 18. It is an advantage of the present invention that the use of a common base 18 allows the bale moistening and handling apparatus 10 to be conveniently relocated. However, the bale handler 12, tank 14, and control means 16 need not all be mounted on base 18 as, for example, if the apparatus 10 is installed in a confined area. By allowing flexibility in the positioning of the bale handler 12, tank 14, and control means 16,the the apparatus 10 may be configured for permanent placement at equestrian venues, mobile deployment at single events, or for custom installation.

The bale handler 12 includes a mast 22 and a boom 24. The mast 22 has an outer member 28 which is slidable over an inner member 26. The inner member 26 has a base end 261 and an outer end 262. The inner member 26 is fixedly attached at its base end 261 by bolts or other suitable means to a hydraulic chain-drive 30 or other suitable actuator which in turn is mounted on the common base 18 of the apparatus 10 by any suitable shaft means. The hydraulic chain-drive 30 or other suitable actuator is operable to rotate the mast 22 of the bale handler 12 about its longitudinal axis. The outer member 28 of the mast 22 is operable, by means of a hydraulic cylinder 32 or other suitable actuator connected between it and the base end 261 of the inner member 26 by suitable pin connectors, to travel over the inner member 26 along that member's longitudinal axis. The outer end 262 of the inner member 26 may be attached to one or more supplementary support members 34 which in turn may be connected to nearby walls, roofing members, or other structures as installation conditions may permit or require. However, these supplementary support members 34 may not be required, for example, if the bale handler 12, tank 14, and control means 16 were all mounted on the base 18.

The boom 24 has a mast end 241 and an outer end 242. The mast end 241 of the boom 24 is connected by bolts or by welding to the outer member 28 of the mast 22 thereby allowing the boom 24 to travel longitudinally with the outer member 28 of the mast 22 along the inner member 26 of the mast 22 and to travel rotationally with both the inner 26 and outer 28 members of the mast 22 about the longitudinal axis of the mast 22.

Again referring to FIGS. 1 and 2, the boom 24 includes a bale gripping device 37. The bale gripping device 37 includes a slidable bale gripping arm 36, a pivoting bale gripping arm 38, and fixed bale guide 40. The slidable bale gripping arm 36 is disposed on the boom 24 proximate 241 to the mast 22. The pivoting bale gripping arm 38 is disposed on the boom 24 proximate the outer end 242. The fixed bale guide 40 is disposed on the boom 24 between the two bale gripping arms 36 and 38. Alternatively, the bale gripping device 37 may be a simple basket-like device.

The slidable bale gripping arm 36 includes a first gripping member 42 suspended from and fixedly connected to a sleeve member 44 by means of bolts or welding. The first gripping member 42 may be L-shaped, for example, to provide additional support for elevated bales. The sleeve member 44 encloses a segment of the boom 24. The slidable bale gripping arm 36 is operable, by means of a hydraulic cylinder 46 or other suitable actuator connected by means of pins between the sleeve member 44 and the point 241 where the boom 24 attaches to the outer member 28 of the mast 22, to travel longitudinally over the boom 24.

The pivoting bale gripping arm 38 includes a second gripping member 48 suspended from the boom 24 by a pin assembly 381. The second gripping member 48 may be L-shaped, for example, to provide additional support for elevated bales. A section 382 of the second gripping member 48 extends above the boom 24 to accept the connection of a hydraulic cylinder 50 or other suitable actuator. The pivoting bale gripping arm 38 is operable, by means of a hydraulic cylinder 50 or other suitable actuator connected between the section 382 of the second gripping member 48 extending above the boom 24 and a point on the main horizontal boom 24 approximately over the point where the fixed bale guide 40 is disposed, to pivot about the longitudinal axis of the outer end 242 of the boom 24.

In operation, a bale 52 may be gripped by the combined operation of the slidable bale gripping arm 36, the pivoting bale gripping arm 38, and the fixed bale guide 40. Using the control means 16, the fixed bale guide 40 is positioned over a bale 52 to be moistened, such that the longitudinal axis of the boom 24 is approximately parallel to the longitudinal axis of the bale 52, and lowered such that contact with the top of the bale 52 is made. The opposing slidable and pivoting bale gripping arms 36, 38 may then be individually or simultaneously operated to close in upon the bale 52, compressing the bale 52, and hence gripping the bale 52. If, for example, L-shaped gripping arms 36 and 38 are employed, additional support for the bale 52 during moistening may be provided.

The control means 16 preferably includes several levers 161 to control the operation of the four hydraulic cylinders 30, 32, 46 and 50, or other suitable actuators, associated with the bale handler 12. It is an advantage of the present invention that the control means 16 and hence bale handler 12 may be easily operated. The hydraulic power source associated with the control means 16 may be mounted on or remote from the base 18. The control means 16 may include a programmable logic controller (PLC) to allow for fully automatic and coin operation. Alternatively, and as will be described below, the apparatus 10 may be manually operated.

Figure 4:
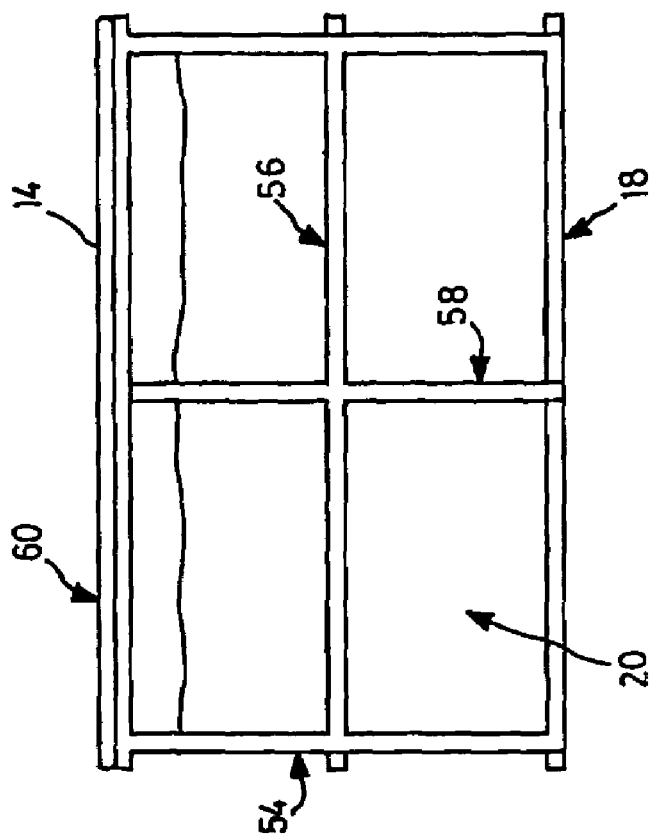
FIG. 4 is a side view of the tank of the apparatus of FIG. 1.
Figure 3:
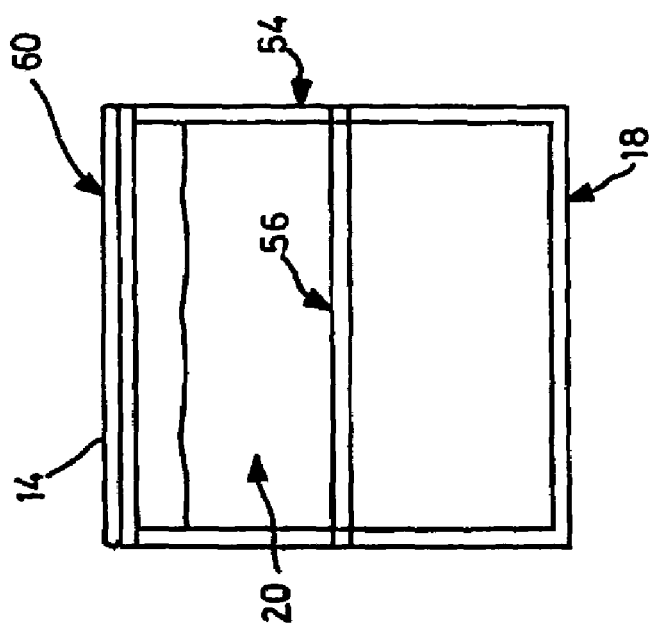
FIG. 3 is a rear view of the tank of the apparatus of FIG. 1.

Referring to FIGS. 3 and 4, side and rear views of the bale moistening tank 14 are illustrated, respectively. The bale moistening tank 14 includes a tank frame 54 enclosing a liquid container 60. The tank frame 54 supports the liquid container 60 and includes suitable strength members 56, 58. The tank frame 54 and liquid container 60 may be rectangular in shape. The liquid container 60 may be composed of lighter-weight materials due to the inclusion of the tank frame 54. The tank frame 54 maintains the liquid container 60 in a fixed position during the submersion of bales. The liquid container 60 is filled with water 20 or another moistening, treating, or conditioning liquid. The bale moistening tank 14 may be equipped with automatic liquid filling means and drain valve means.

Referring to FIGS. 1, 2, 3 and 4, the apparatus 10 is operable by the control means 16 and bale handler 12 to: grip a bale 52 which may be located on either side of the base 18; elevate, rotate, and position the bale 52 over the bale moistening tank 14 which may be located near the centre of the base 18 and which is filled with a bale moistening, conditioning, or treating liquid 20; lower and submerge the bale 52 in the liquid 20 contained in the bale moistening tank 14; elevate the then moistened bale 52 over the bale moistening tank 14 to allow excess liquid to drain from the bale 52 back into the tank 14; and, rotate, lower, and deposit the moistened bale 52 again on either side of the base 18. Note that it is preferable that the apparatus 10 maintains a grip on the bale 52 during submersion in the liquid 20 as bales, particularly hay bales, tend to float. The apparatus 10 is thus applicable to the moistening and handling of hay and to the reduction or elimination of dust in hay.

In the following, several alternative embodiments of the invention will be described. These alternative embodiments vary from the preferred embodiment in several ways including the following: configuration of components; power source; means used to grip bales; orientation of bales handled; pick up location of bales; deposit location of bales; size and shape of bales handled; and, number of bales handled at one time.

Figure 5:
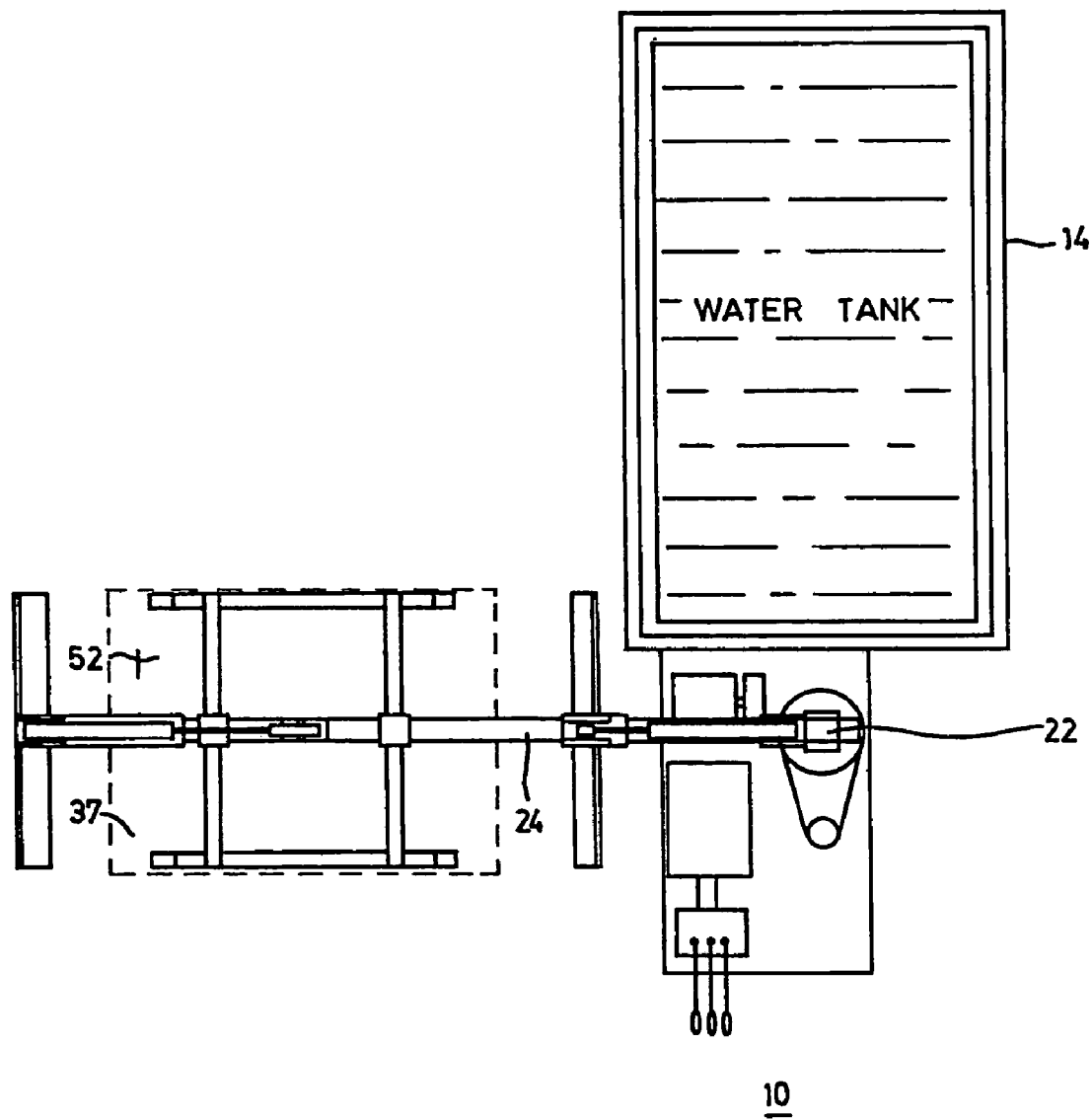
FIG. 5 is a top view illustrating a bale moistening and handling apparatus in accordance with an alternate embodiment of the invention.

Referring to FIG. 5, there is shown a top view illustrating a bale moistening and handling apparatus 10 in accordance with an alternate embodiment of the invention. The boom 24 of the apparatus 10 is shown rotated to the left side. The apparatus is configured to handle multiple bales. Two bales 52 are illustrated. It is understood that the apparatus 10 may handle bales 52 of different shape and size.

Figure 6:
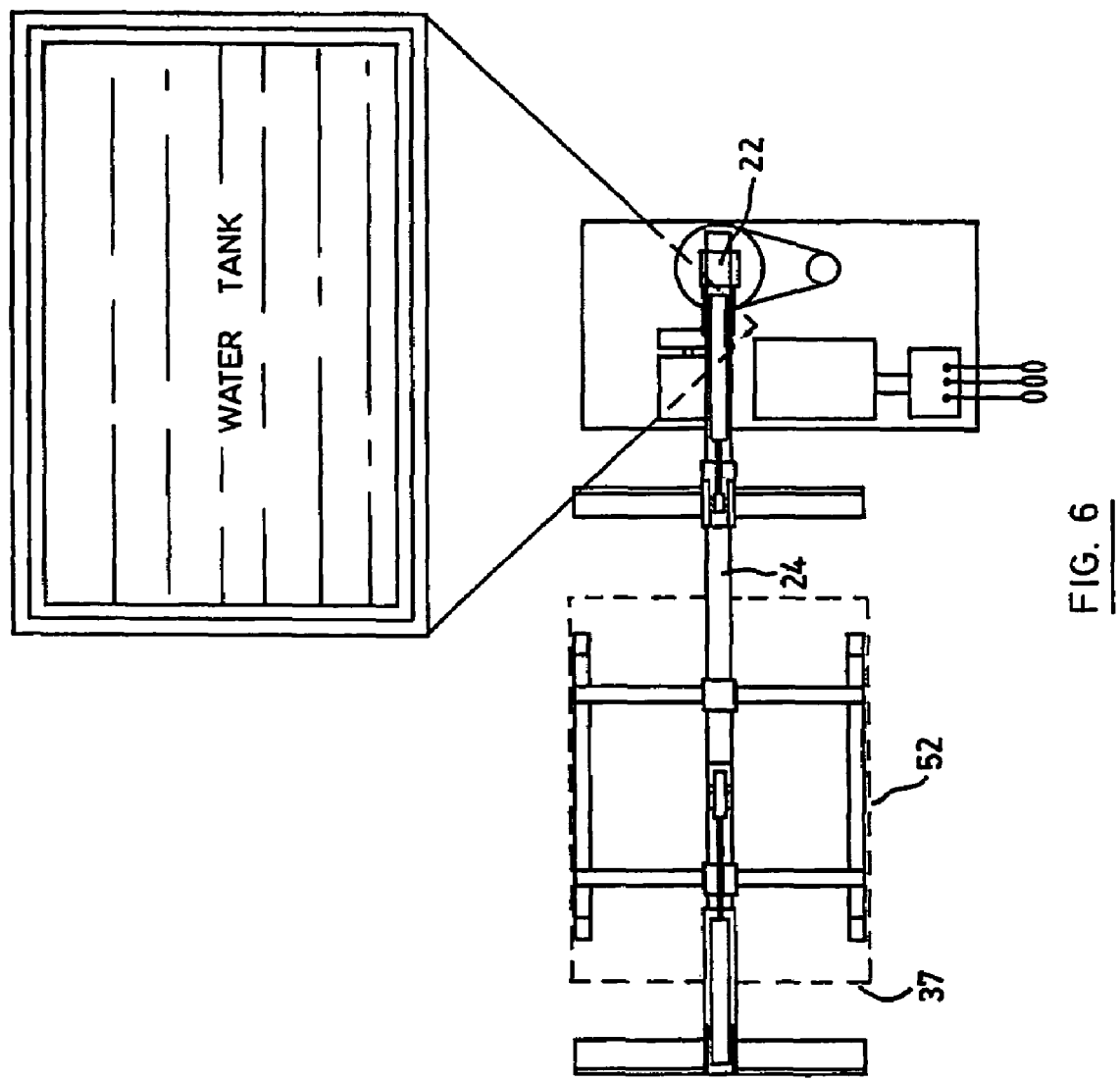
FIG. 6 is a top view illustrating a bale moistening and handling apparatus in accordance with an alternate embodiment of the invention.

Referring to FIG. 6, there is shown a top view illustrating a bale moistening and handling apparatus 10 in accordance with an alternate embodiment of the invention. In this embodiment, the bales 52 are rotated ninety degrees with respect to the boom 24. The tank 14 is also rotated ninety degrees to accept the reoriented bales 52. The rotation of the bales 52 and tank 14 may allow the apparatus to be installed in a smaller space.

Figure 7:
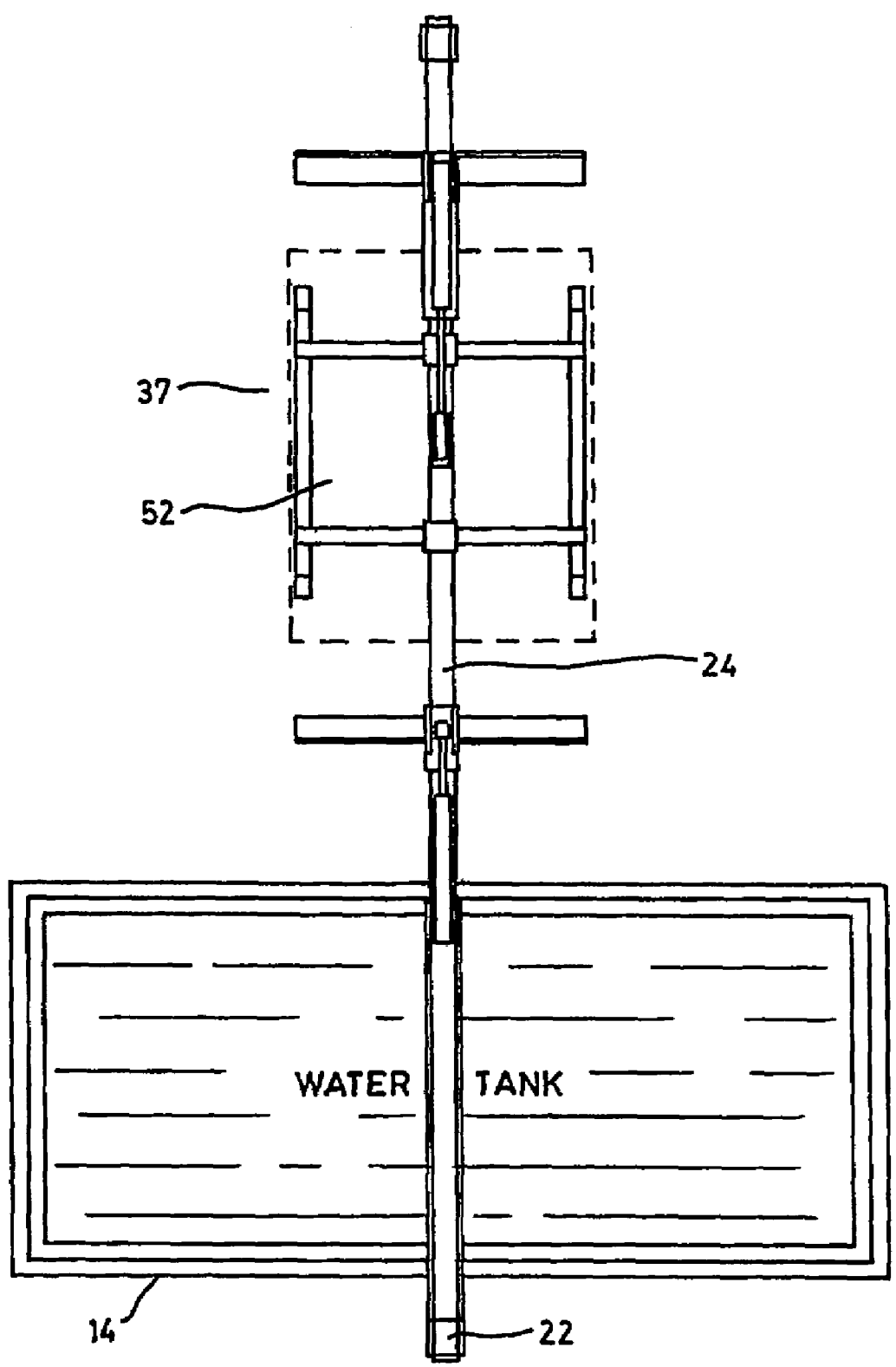
FIG. 7 is a top view illustrating a bale moistening and handling apparatus in accordance with an alternate embodiment of the invention.

Referring to FIG. 7, there is shown a top view illustrating a bale moistening and handling apparatus 10 in accordance with an alternate embodiment of the invention. In this embodiment, the boom 24 is mounted between two posts 22 and the bale gripping device 37 is slidable along the boom 24. This embodiment has the advantage that means for rotating the boom 24 are not required. Consequently, this embodiment may require may be installed in a smaller space.

Figure 8:
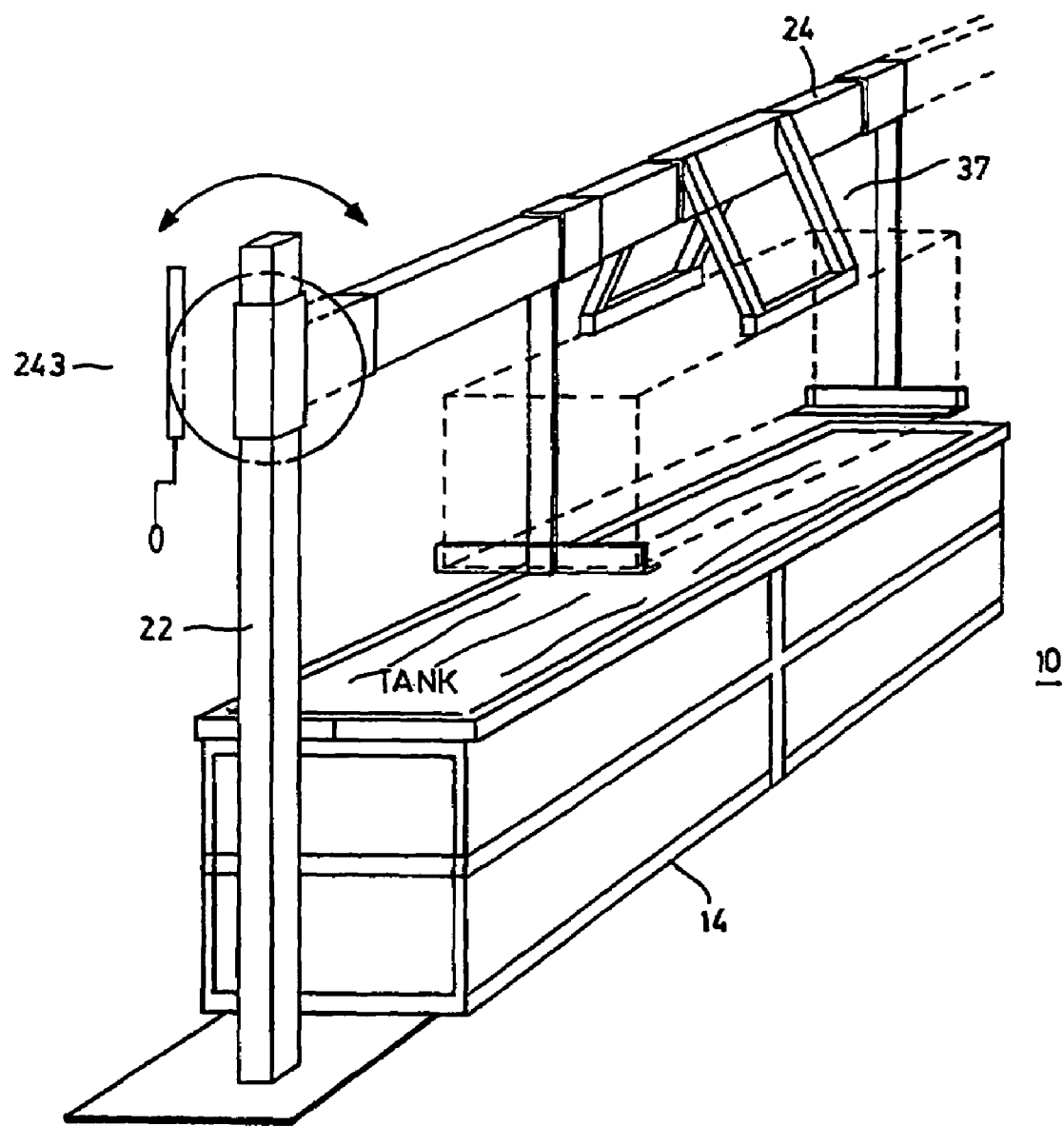
FIG. 8 is a front perspective view illustrating a bale moistening and handling apparatus in accordance with an alternate embodiment of the invention.
Figure 9:
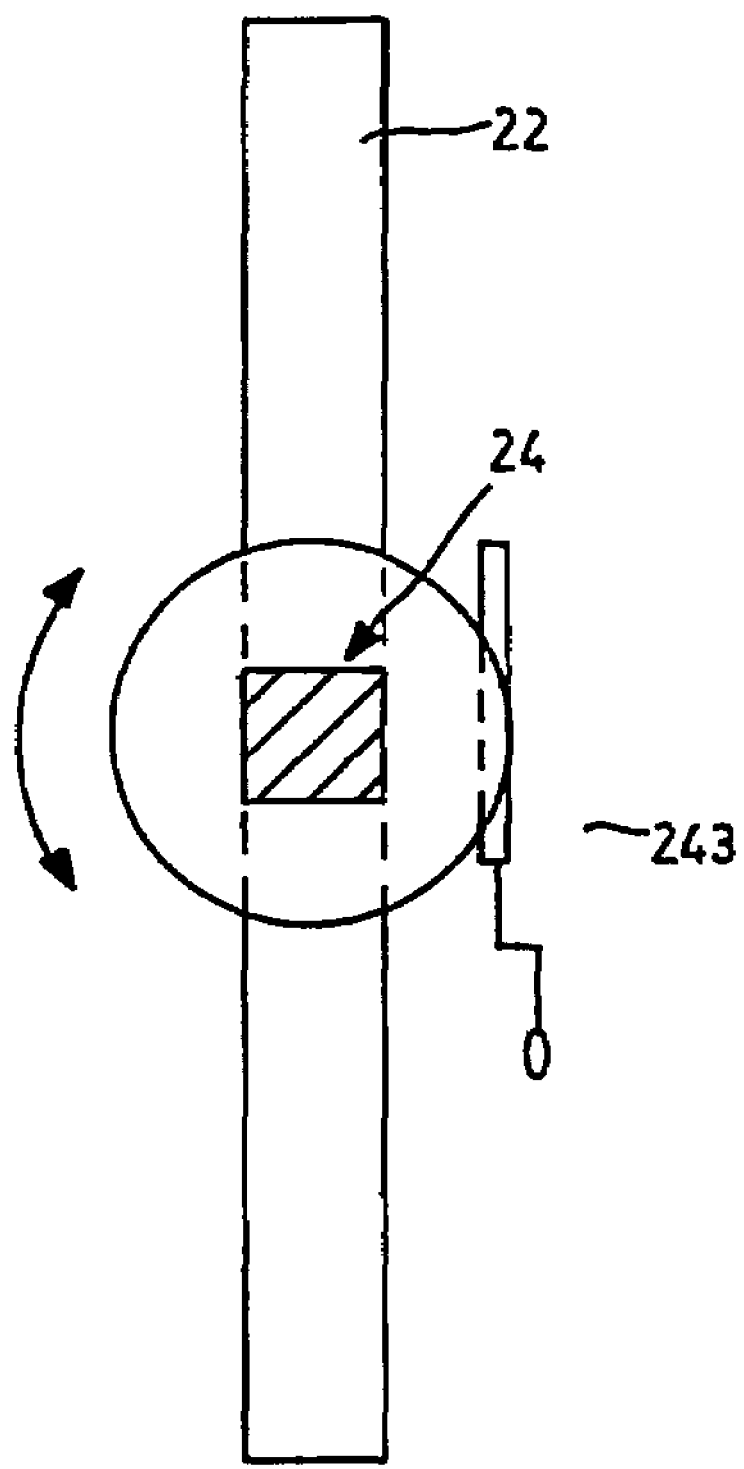
FIG. 9 is a detail front view illustrating the boom rotation means of the apparatus of FIG. 8.

Referring to FIG. 8, there is shown a front perspective view illustrating a bale moistening and handling apparatus 10 in accordance with an alternate embodiment of the invention. In this embodiment, means 243 are provided to rotate the boom 24 about its longitudinal axis. The boom rotation means 243 may be a worm gear or similar device and may be coupled between the boom 24 and mast 22 at the point 241 where these two members meet. The boom rotation means 243 may be operated by the control means 16. The boom rotation means 243 allows the bale gripping device 37 access to bales that may be stored on a rack located above the apparatus 10. With the boom rotation means 243, the apparatus 10 may be operated, for example, in a two-story building. A detail front view of the boom rotation means 243 is illustrated in FIG. 9.

Figure 10:
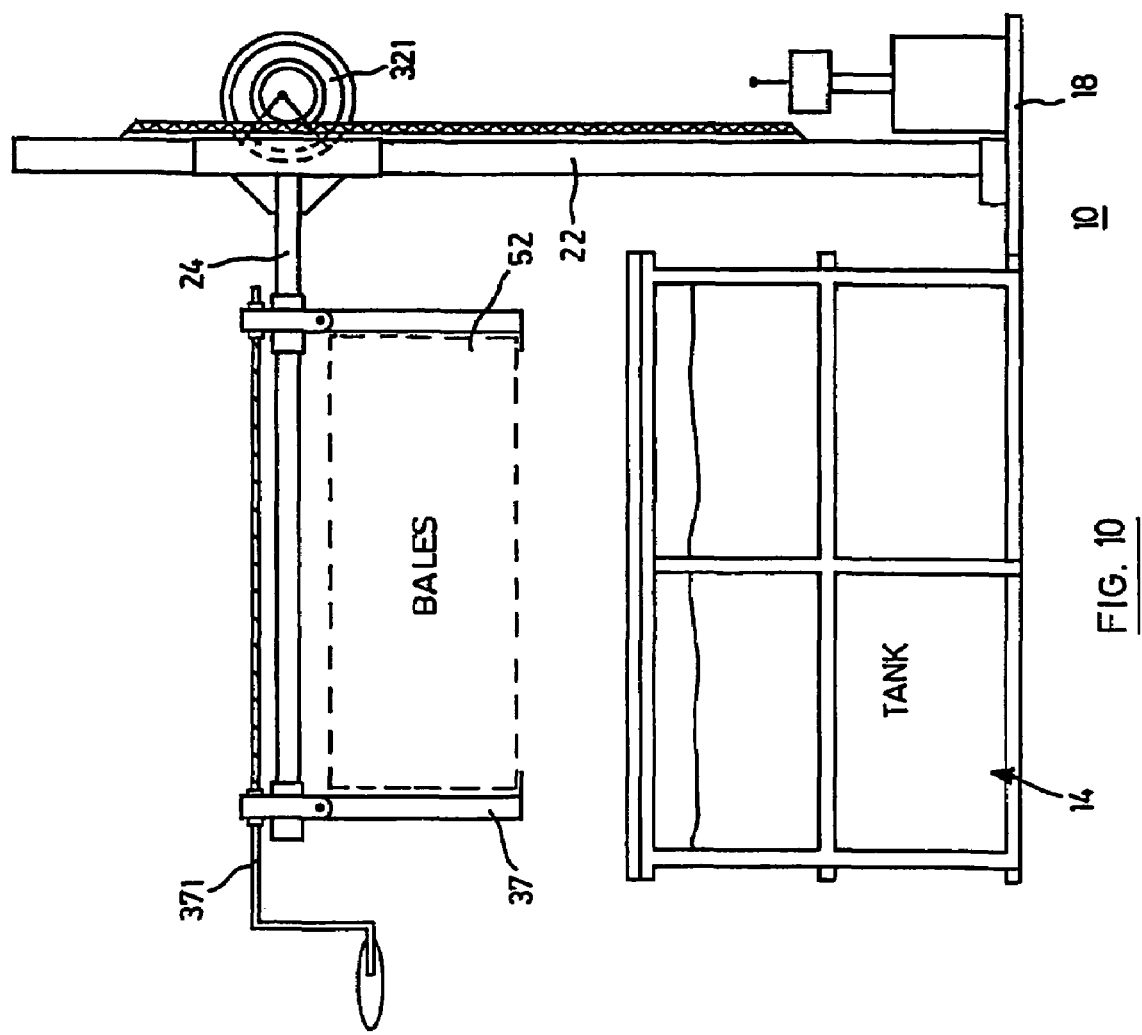
FIG. 10 is a side view illustrating a bale moistening and handling apparatus in accordance with an alternate embodiment of the invention.

Referring to FIG. 10, there is shown a side view illustrating a bale moistening and handling apparatus 10 in accordance with an alternate embodiment of the invention. In this embodiment, a rack and pinion means 321 is used to raise and lower the boom 24 along the mast 22 rather than a hydraulic cylinder 32 as illustrated in FIG. 1. The rack and pinion means 321 allows the apparatus 10 to be operated manually. In addition, the bale gripping device 37 may be operated manually using a crank and screw means 371 rather than hydraulic cylinders 46, 50 as illustrated in FIG. 1. In this embodiment, the bale gripping device 37 includes two opposed, slidable bale gripping arms 36.

Figure 11:
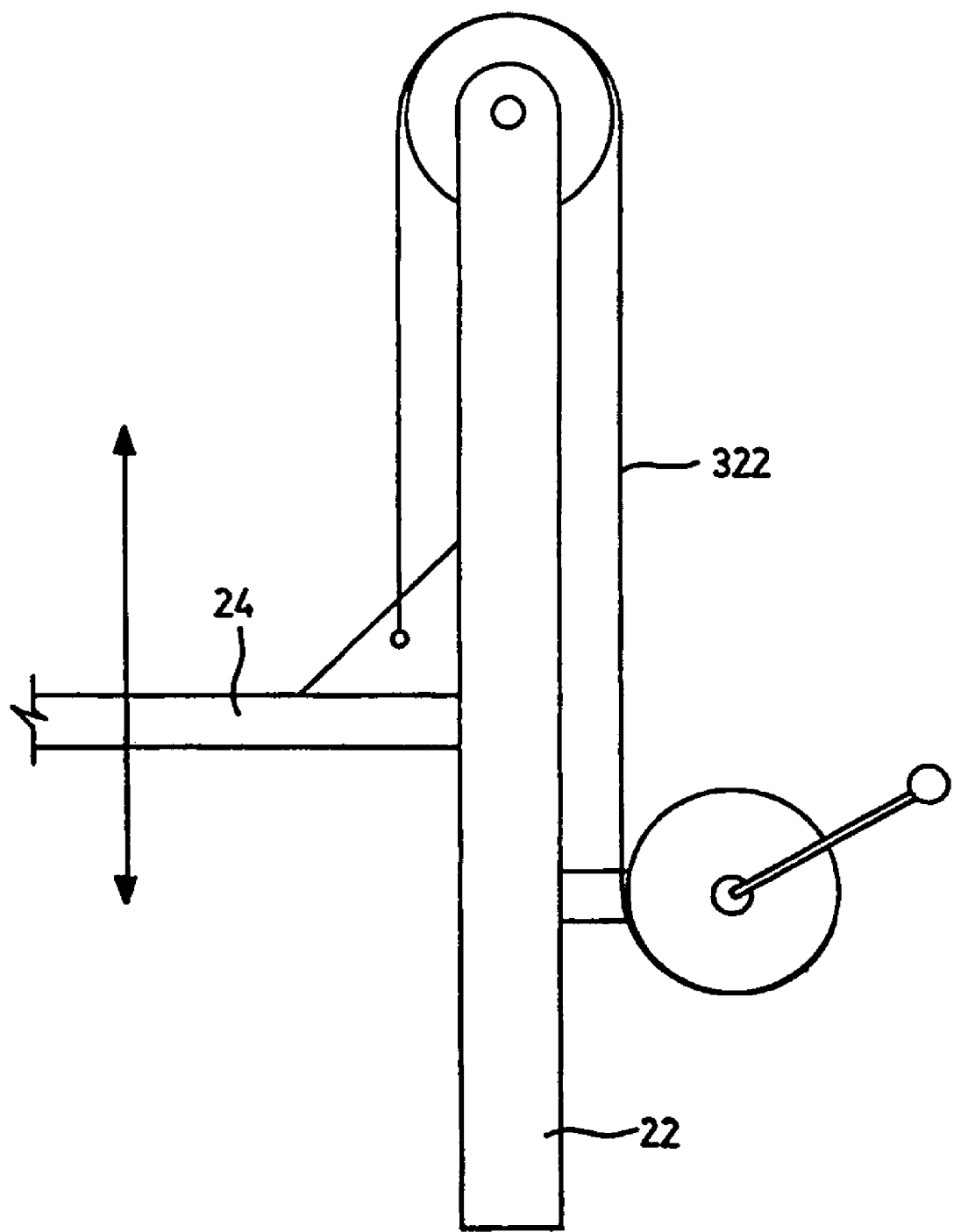
FIG. 11 is a partial side view illustrating a bale moistening and handling apparatus in accordance with an alternate embodiment of the invention.

Referring to FIG. 11, there is shown a partial side view illustrating a bale moistening and handling apparatus 10 in accordance with an alternate embodiment of the invention. In this embodiment, a cable and hand winch means 322 is used to raise and lower the boom 24 along the mast 22 rather than a rack and pinion means 321 as illustrated in FIG. 10.

Figure 12:
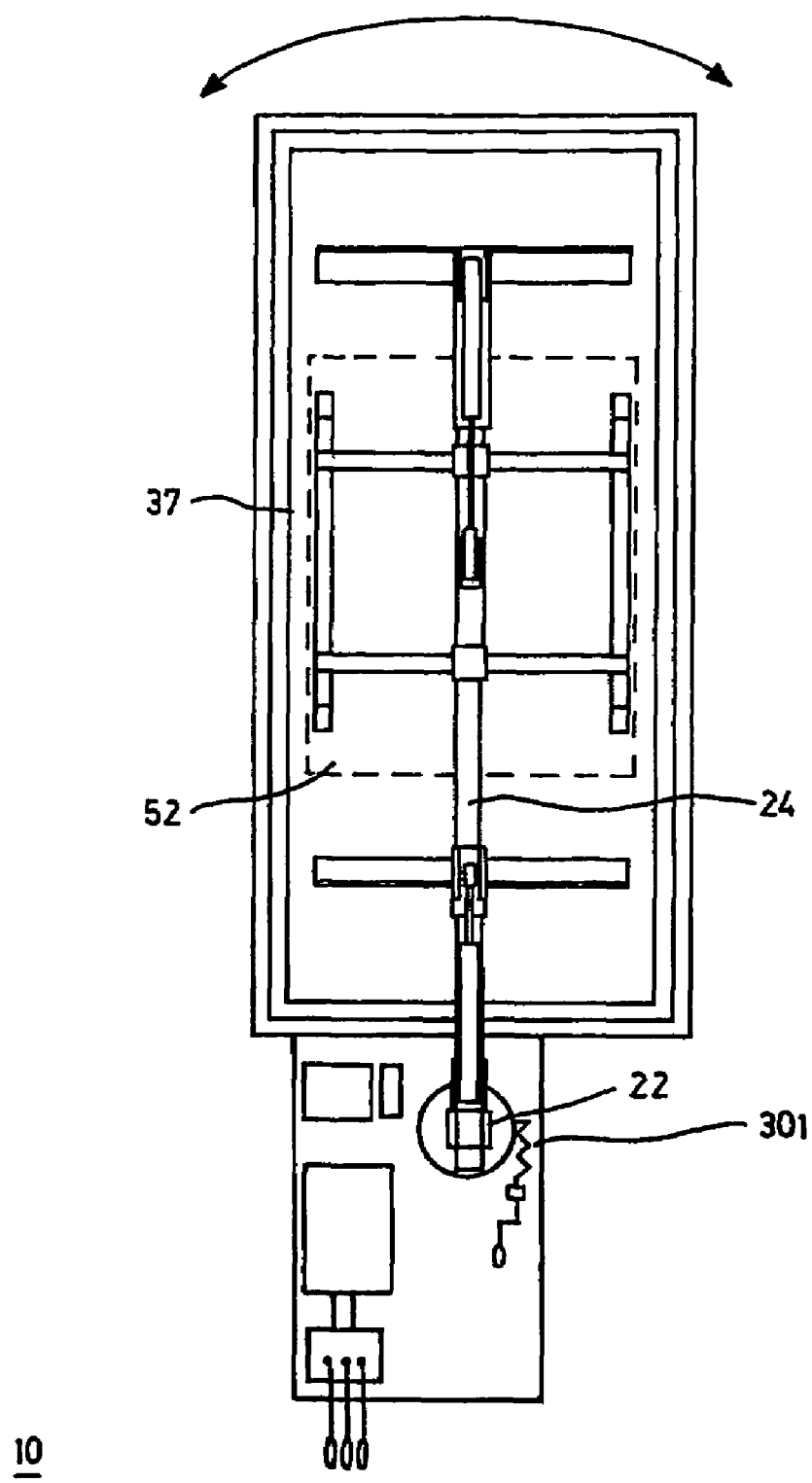
FIG. 12 is a partial top view illustrating a bale moistening and handling apparatus in accordance with an alternate embodiment of the invention.

Referring to FIG. 12, there is shown a partial top view illustrating a bale moistening and handling apparatus 10 in accordance with an alternate embodiment of the invention. In this embodiment, a hand crank and worm gear means 301 is used to rotate the mast 22 rather than a hydraulic chain-drive 30 as illustrated in FIGS. 1 and 2. The hand crank and worm gear means 301 allows the apparatus 10 to be operated manually.

Further modifications are possible. For instance, in the embodiment shown in FIG. 1, the actuators employed in apparatus 10 to selectively raise or lower the boom 24, and to urge the bale gripping device 37 to grip the bale 52, are exposed to the environment. This need not be the case in every application. In an alternative embodiment, different actuators could be used. These actuators could be disposed in such a manner so as to minimize their exposure to the environment and mitigate the risks of injury or environmental contamination in the event of malfunction or breakdown.

Figure 13:
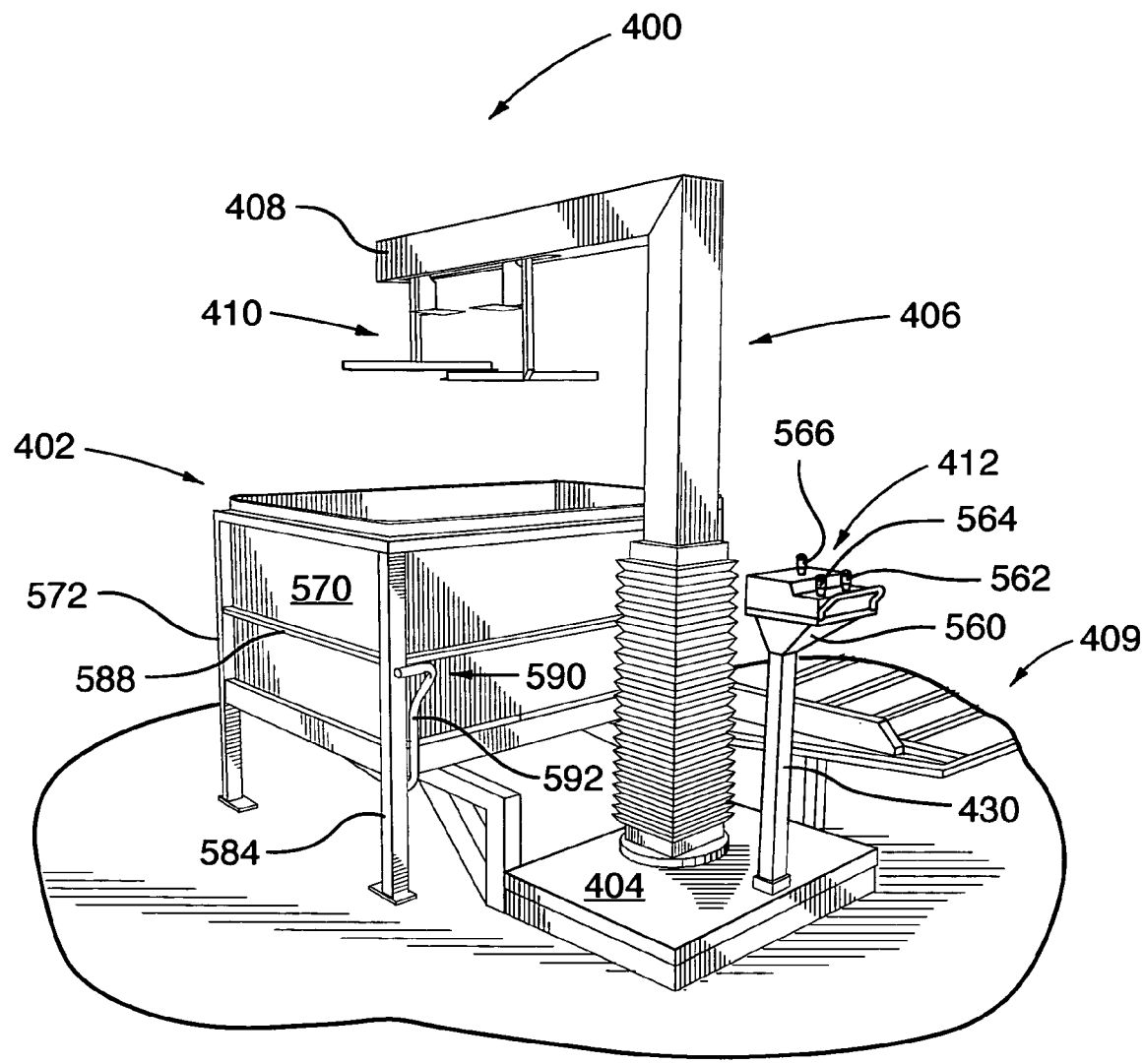
FIG. 13 is a left perspective view of a bale moistening and handling apparatus in accordance with still another alternate embodiment of the invention.
Figure 14:
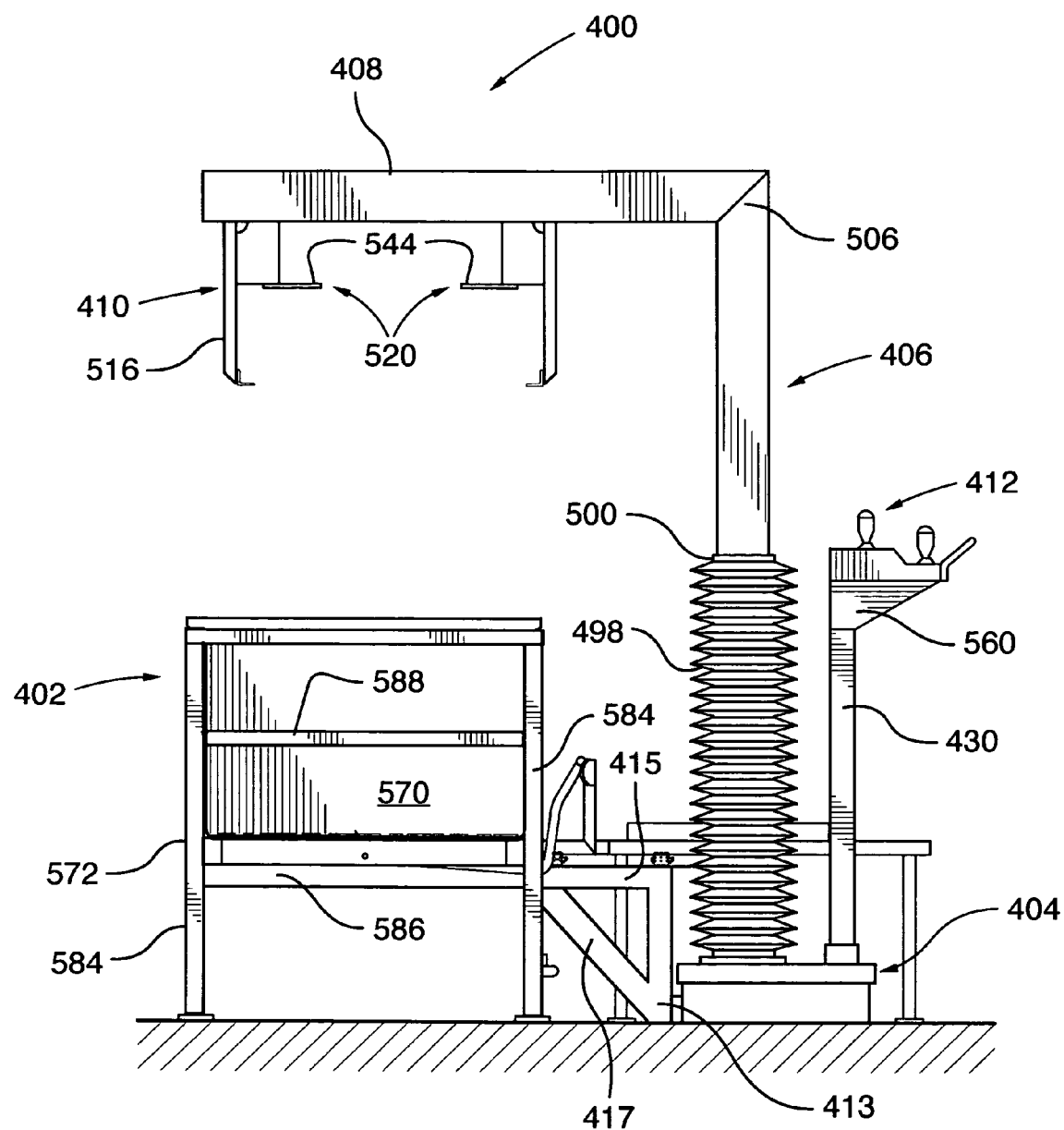
FIG. 14 is a left side elevation view of the bale moistening and handling apparatus shown in FIG. 13.
Figure 29A:
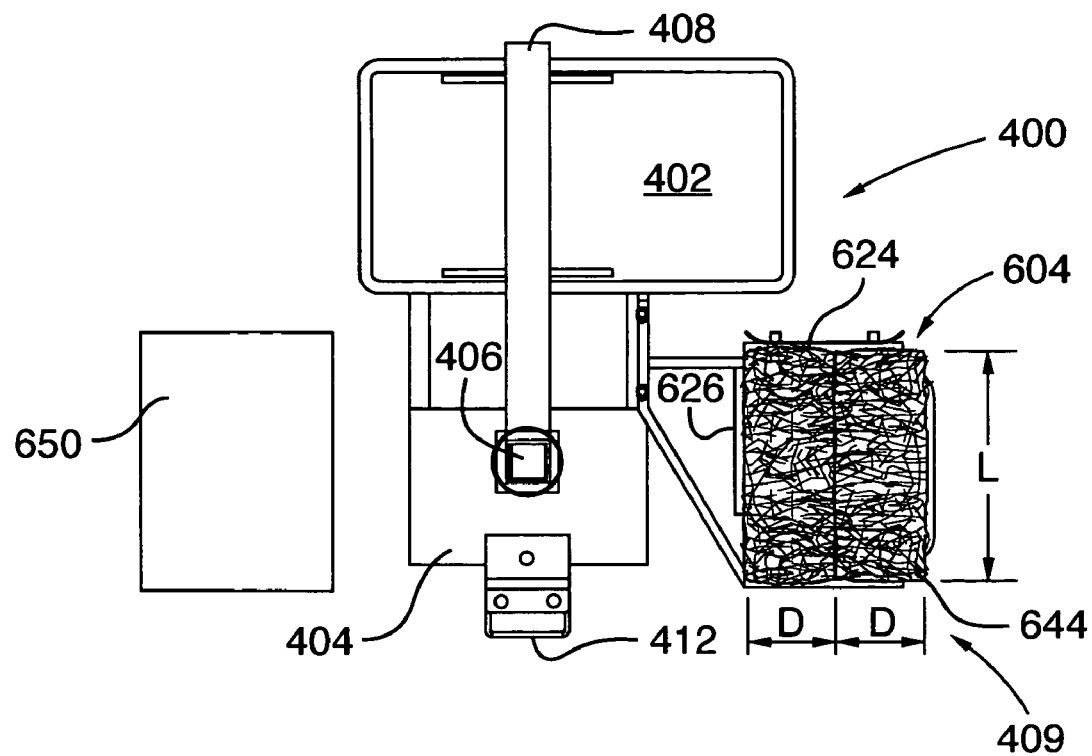
FIG. 29a-29d are top plan schematic views showing the handling of bale during a typical operating sequence of the bale handling and moistening apparatus of FIG. 13.
Figure 29B:
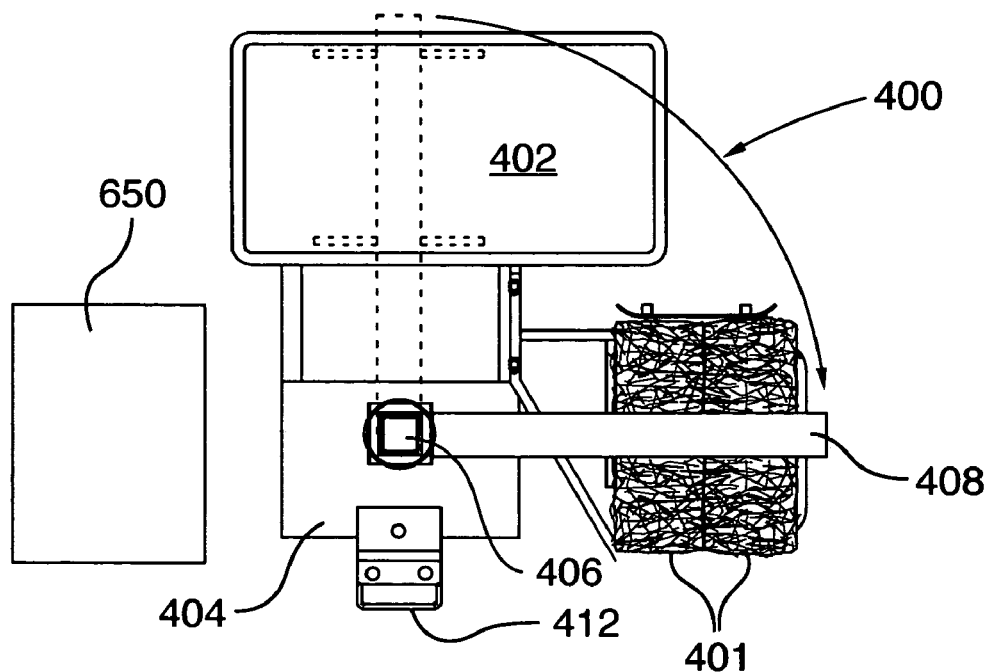
Figure 29C:
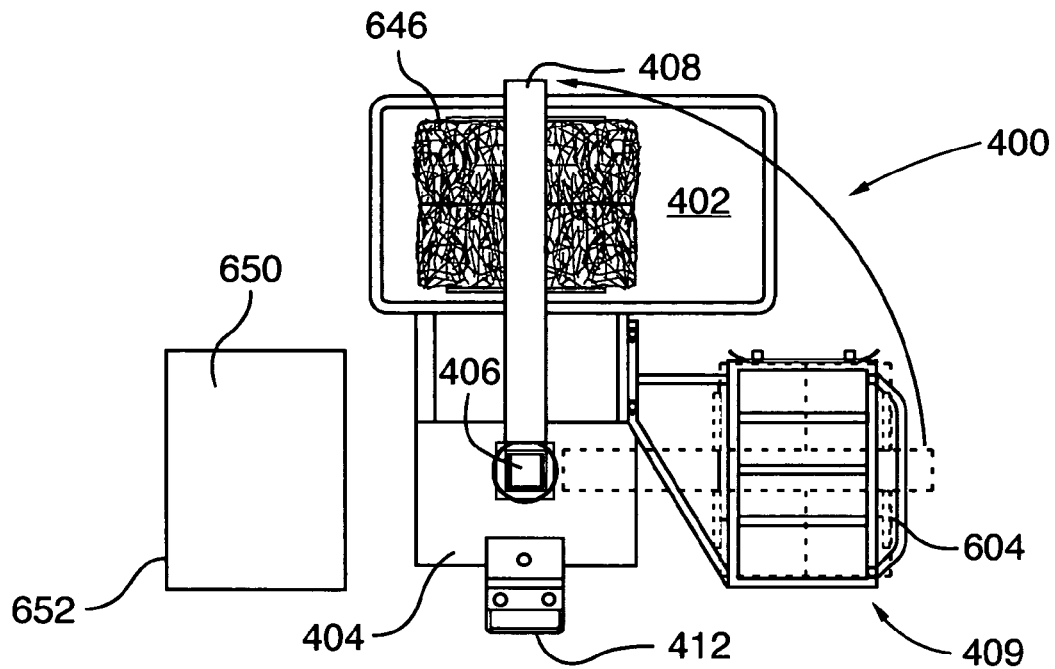
Figure 29D:
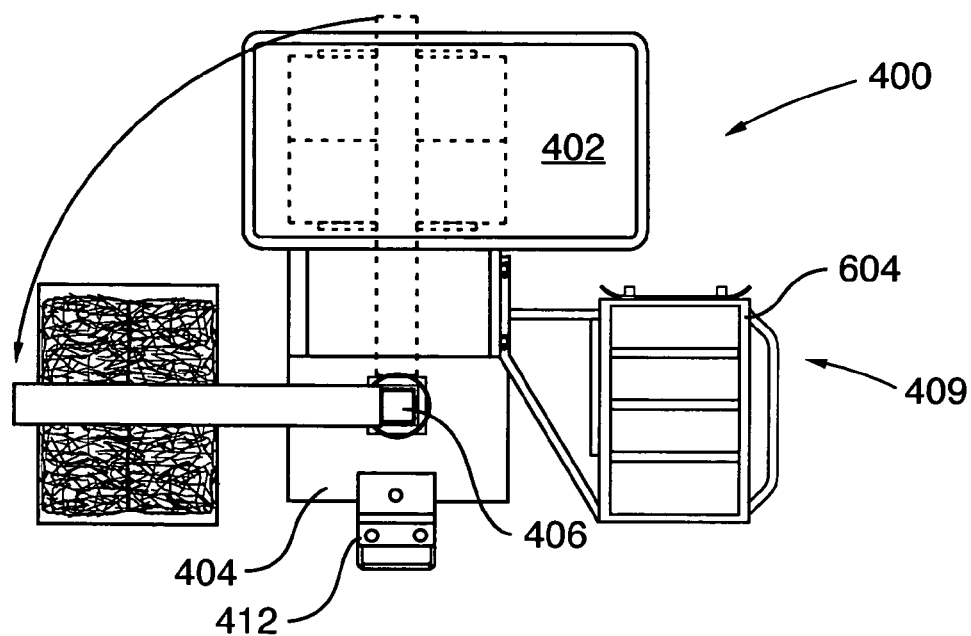
Figure 30A:
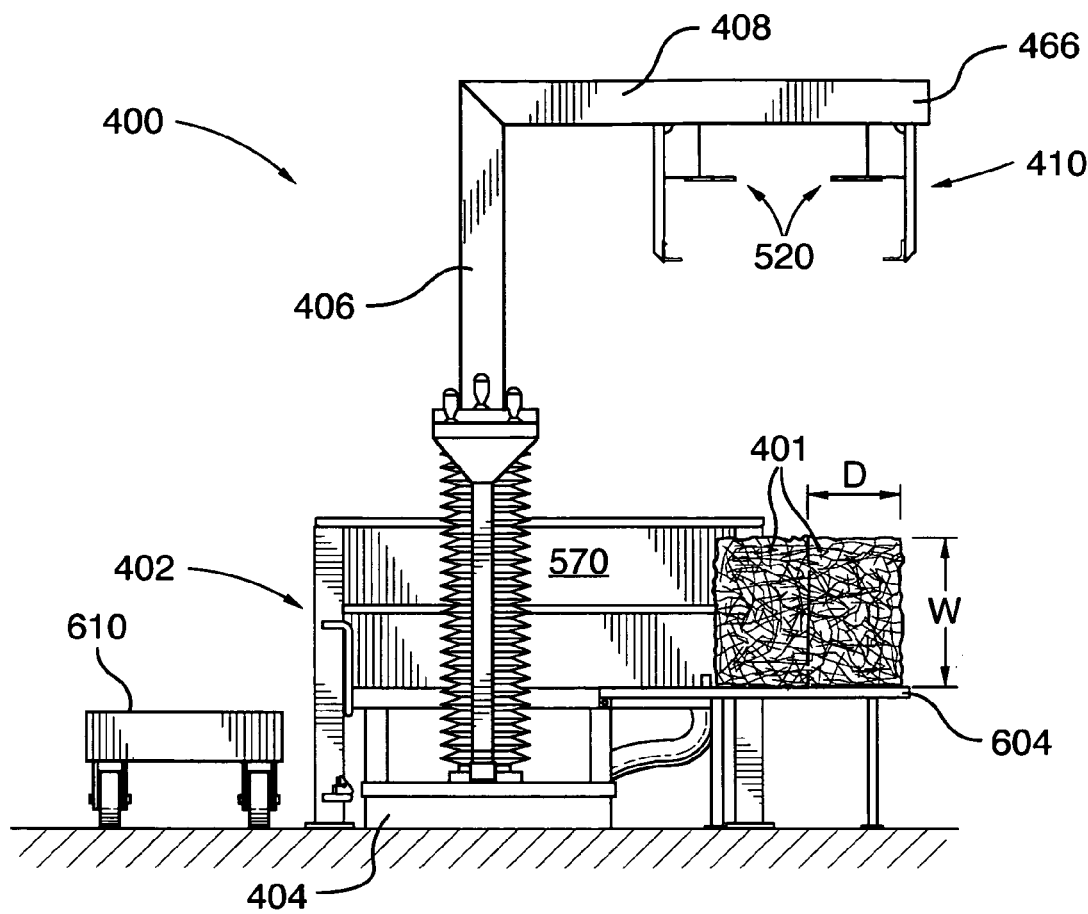
FIG. 30a-30g are end elevation views of the bale handling and moistening apparatus of FIG. 13 during a typical operating sequence.
Figure 30B:
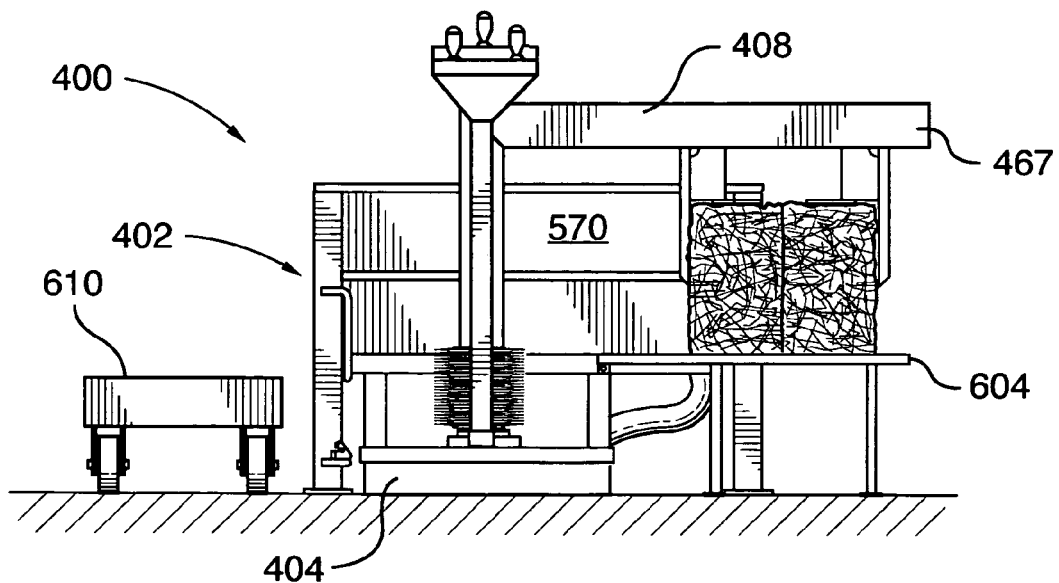
Figure 30C:
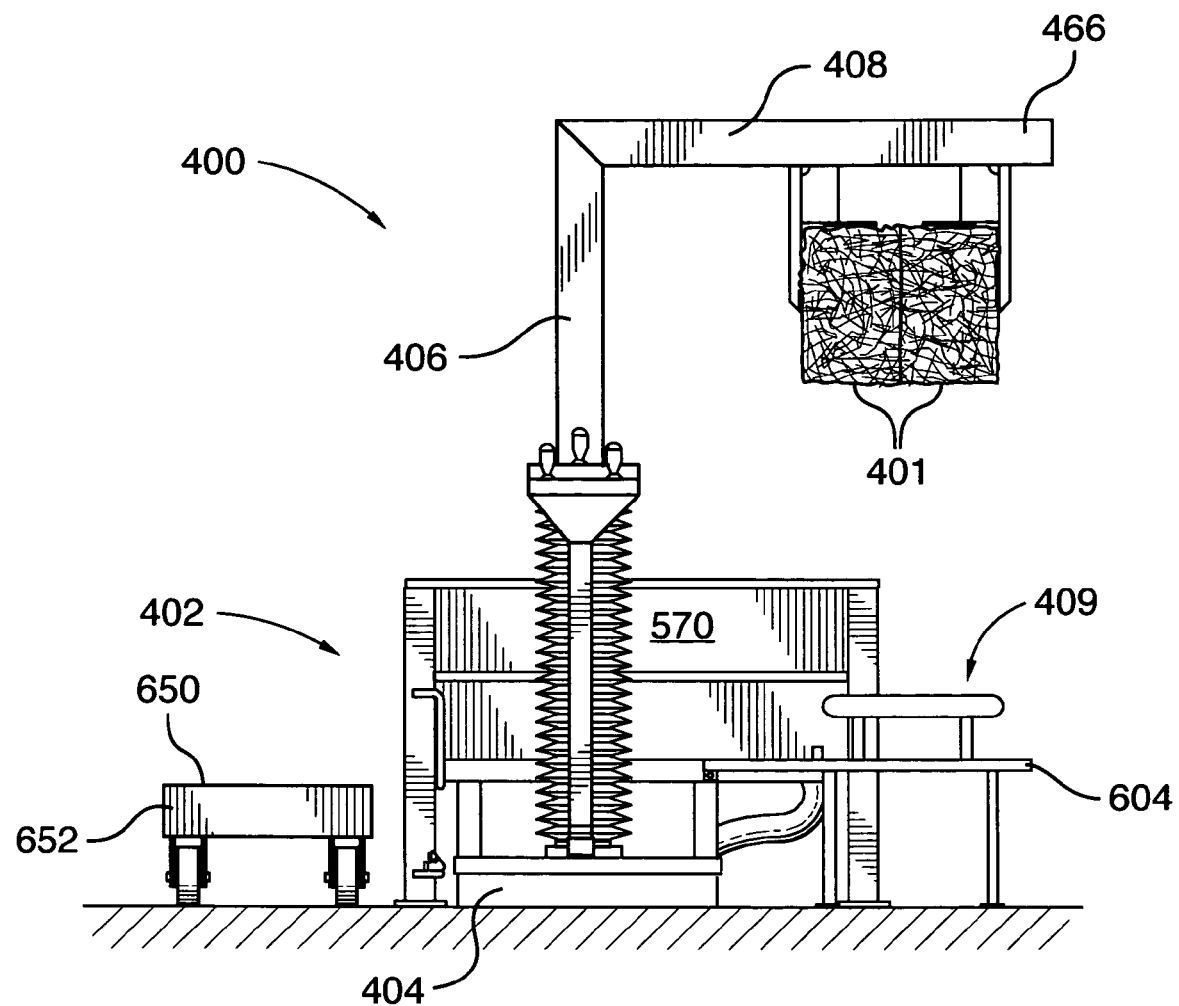
Figure 30D:
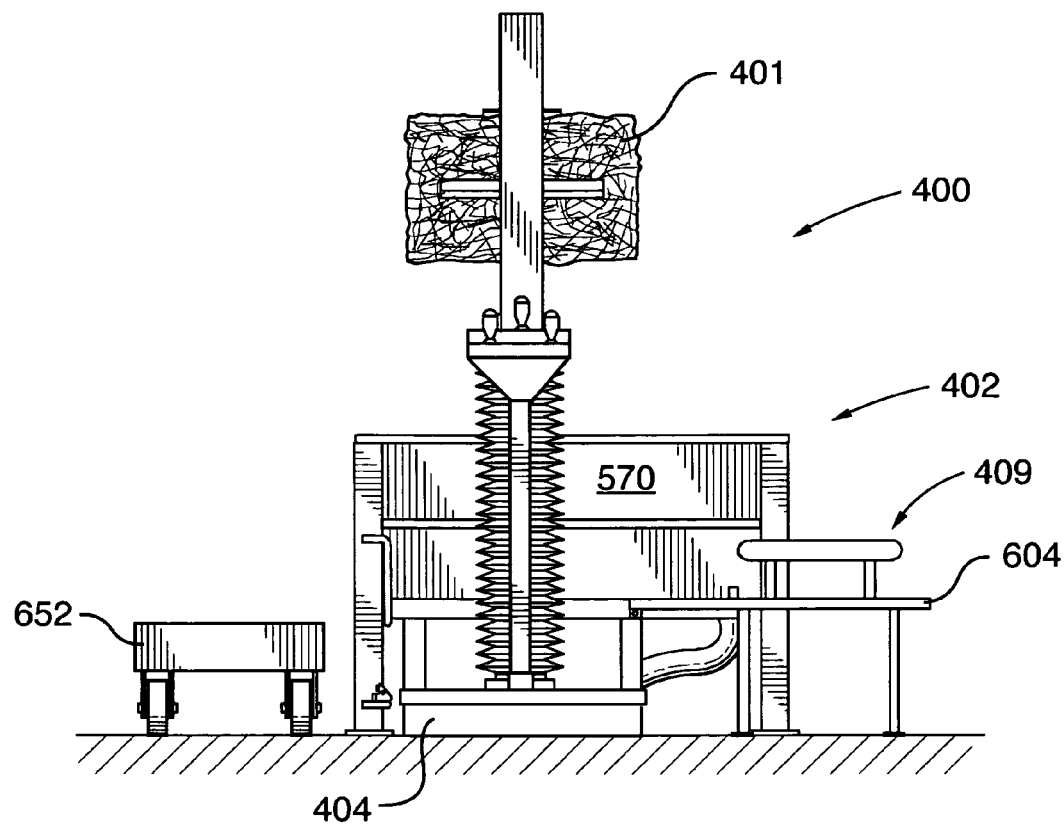
Figure 30E:
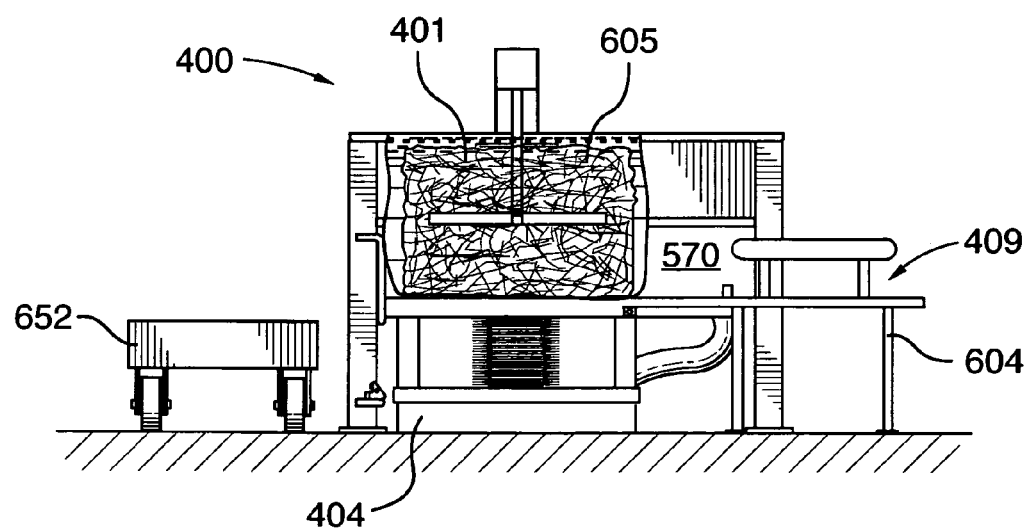
Figure 30F:
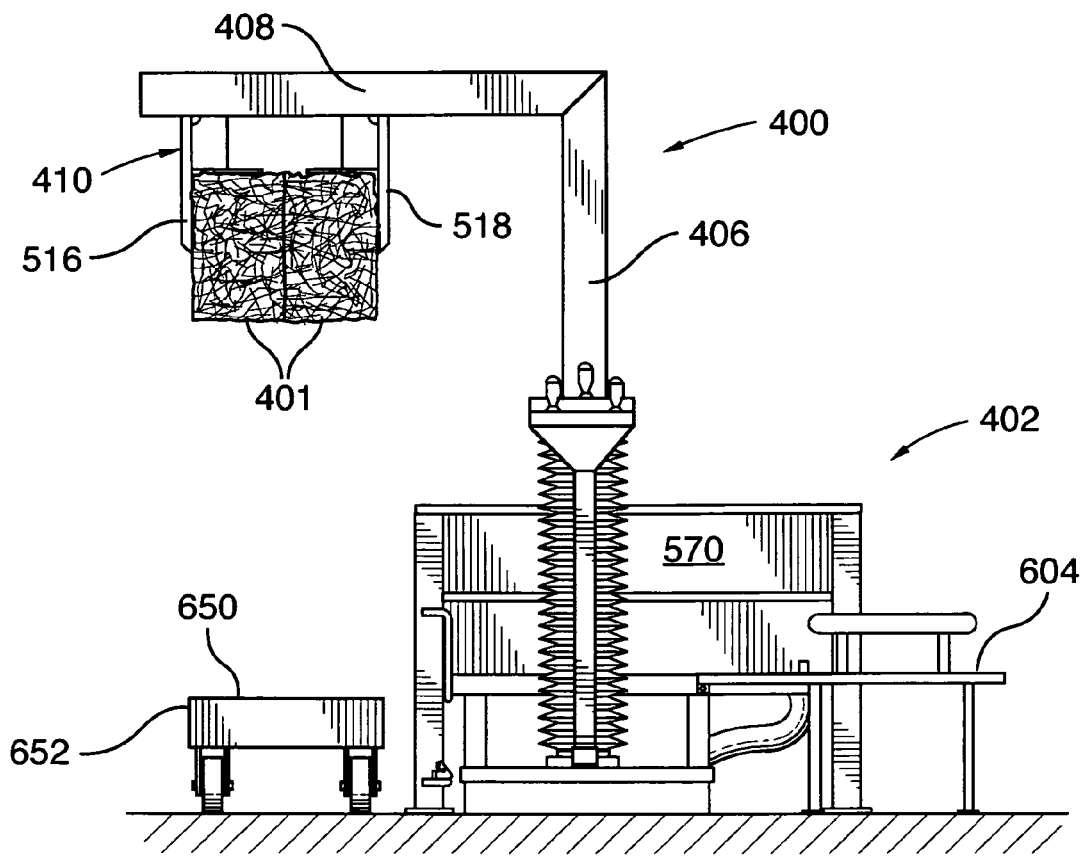
Figure 30G:
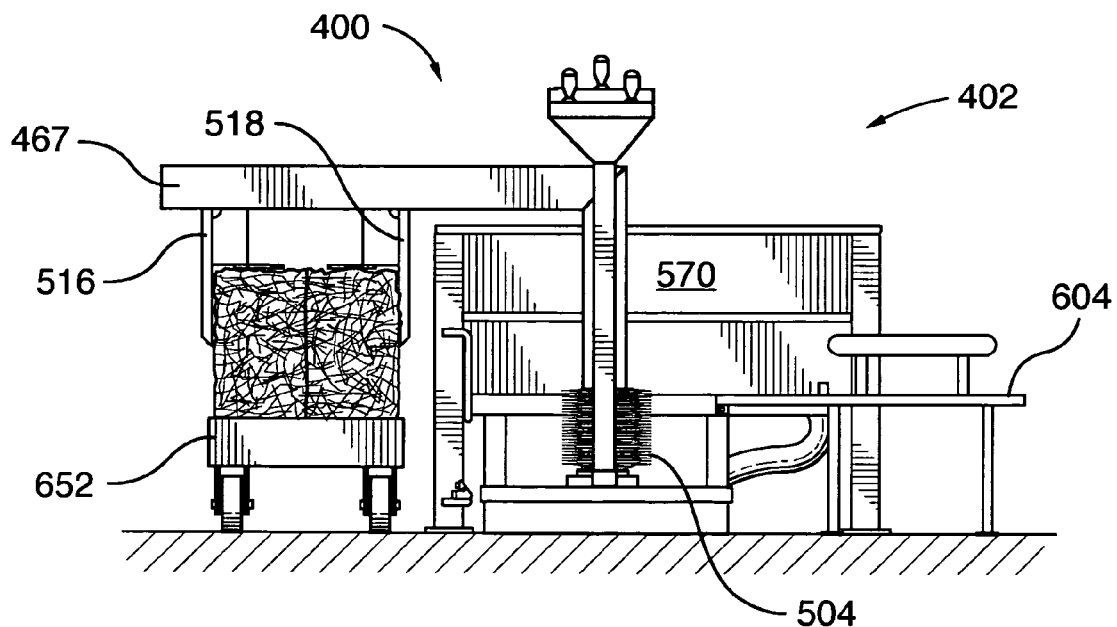

Referring now to FIGS. 13 and 14, there is shown an alternate bale handling and moistening apparatus, designated generally with reference numeral 400. Apparatus 400 is versatile in that it is generally adapted to handle one or more bales of different shapes and sizes. In this embodiment, the apparatus 400 preferably handles two, relatively small, abutting, bales 401 standing side-by-side. Bales 401 are of the type commonly used in the horse raising industry. A typical bale 401 has a width W of 18 inches, a length L of 32 inches (as shown in FIG. 29a) and a depth D of 14 inches (as shown in FIG. 30a).

Apparatus 400 is generally similar to apparatus 10 shown in FIG. 1 in that it includes: an open-topped tank 402, a base 404, a mast assembly 406 extending upwardly from the base 404, a boom 408 carried by the mast assembly 406, and a bale gripping device 410 depending from the boom 408. Apparatus 400 is also provided with a bale positioning device 409 for orienting the bales 401 to facilitate the gripping thereof by the bale gripping device 410. Control means 412 govern operation of the apparatus 400.

In this embodiment, the base 404 supports the mast assembly 406 and the control means 412, while the open-topped tank 402 rests directly on a structural support surface, such as a floor. However, the open-topped tank 402 is fixedly connected to the base 404 by way of hollow structural steel (HSS) frame members 413. The frame members 413 are assembled to form a knee member 415 that extends to connect to the open-topped tank 402. The knee member 415 is reinforced with a short diagonal brace 417.

Attachment of the open-topped tank 402 to the base 404 serves a dual purpose. First, it tends to enhance the overall stability of the apparatus 400 by counteracting the moment exerted on the mast assembly 406 and boom 408. Second, establishing a fixed positional relationship between the tank 402 and the base 404 (and mast assembly 406) obviates the need to position or align the tank 402 with the mast assembly 406 prior to using apparatus 400, thereby facilitating bale handling and moistening operations.

While it is preferred that the tank 402 be permanently attached to base 404, this need not be the case in every application. If desired, the tank may be detachable from the base or moreover, its positioning relative to the base may be selectively adjustable. In yet a further alternative embodiment, the tank could remain unattached to the base.

Figure 16:
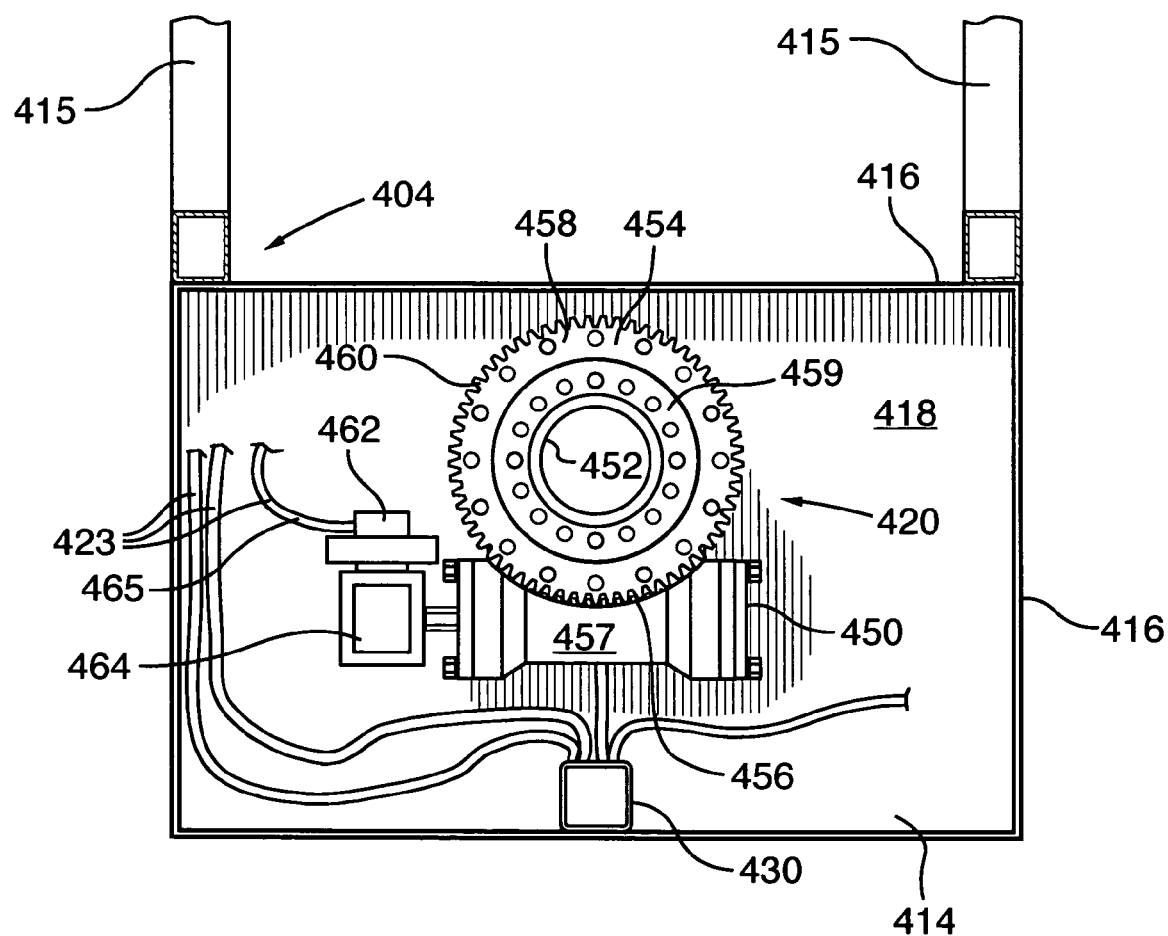
FIG. 16 is a top plan view of the rotational motion actuator of FIG. 15 with the mast assembly removed for clarity.

Referring to FIG. 16, the base 404 is of generally box-like construction. It has a bottom wall 414 that is preferably anchored to a support surface or floor, and plurality of short side walls 416 that extend upwardly from the bottom wall 414. The walls 414 and 416 co-operate with each other to define an internal compartment 418. The internal compartment 418 houses rotational motion actuator 420 responsible for urging the mast assembly 406 to rotate about its longitudinal axis 422 (best shown in FIG. 17), and a plurality of power feed lines, generally designated with reference numeral 423. The base 404 further includes a cover plate 424 sized to fit over top the internal compartment 418 and conceal the rotational motion actuator 420. The cover plate 424 includes a first cutout (not shown) through which the mast assembly 406 extends, and a second, relatively smaller, cutout 428 for receiving therethrough the pedestal 430 that supports the control means 412. Mounted over the first cutout is an apertured circular plate 432 whose raised innermost edges define a generally square, aperture 434. The circular plate 432 is fastened to the mast assembly 406.

Figure 15:
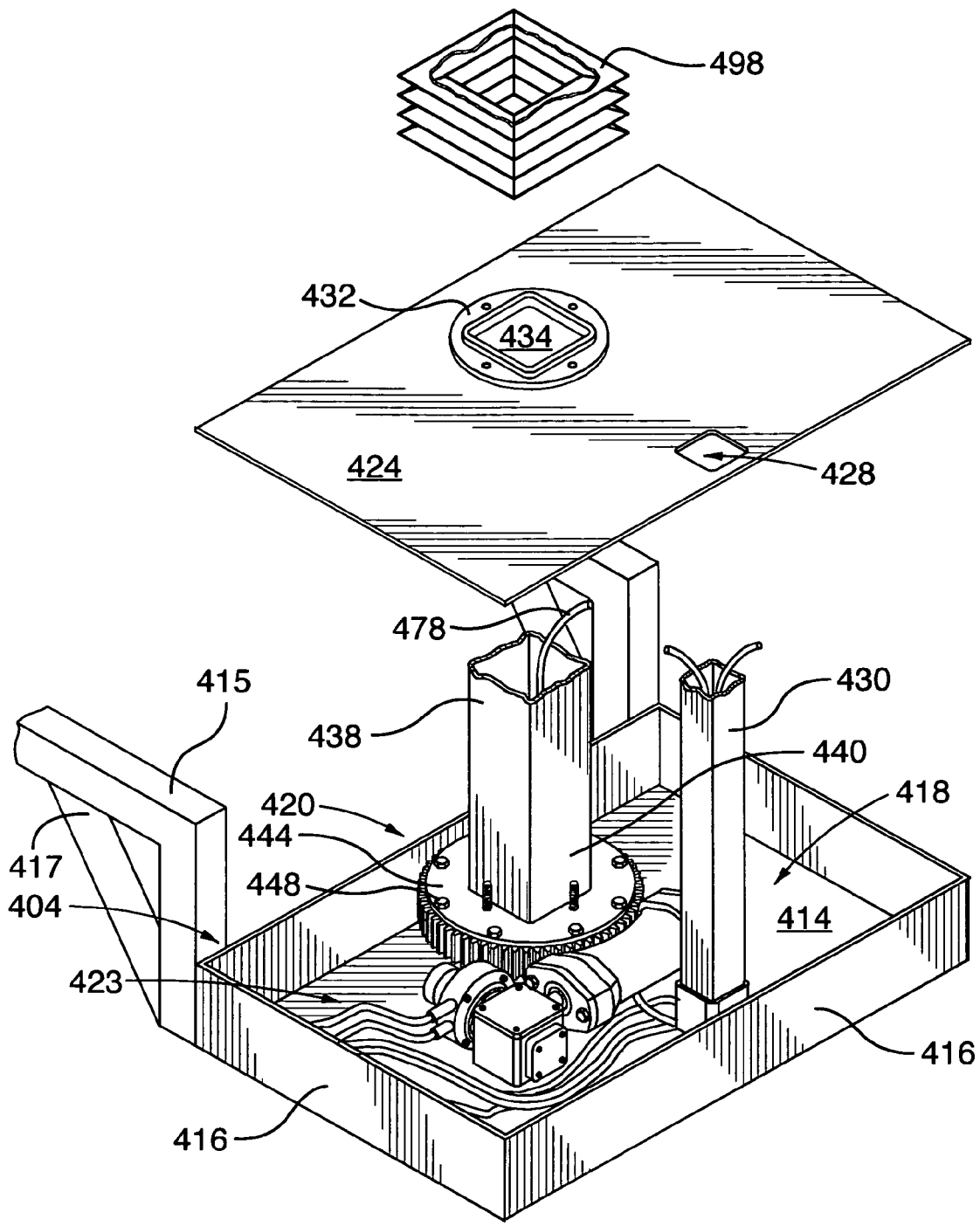
FIG. 15 is a partial, exploded perspective view of the base of the bale moistening and handling apparatus shown in FIG. 13 with the vertical displacement actuator removed for clarity, illustrating the rotational motion actuator used to urge the mast assembly to rotate about its longitudinal axis.
Figure 17:
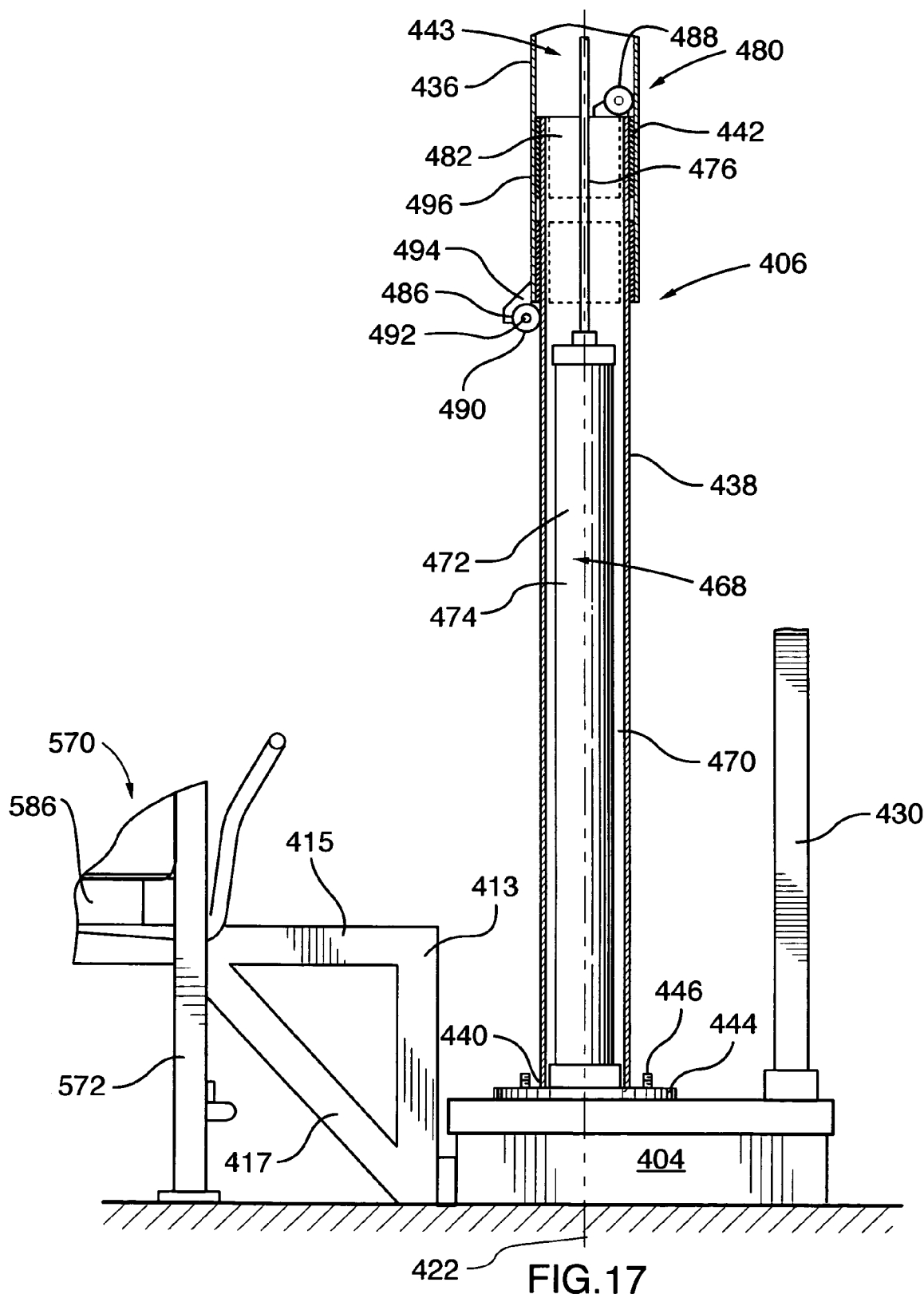
FIG. 17 is a partial cross-sectional view of the mast assembly of the bale moistening and handling apparatus shown in FIG. 13 with the various pneumatic feed lines removed for clarity, illustrating the vertical displacement actuator used to slideably move the outer mast portion relative to the inner mast portion.

With reference to FIGS. 15, 16 and 17, the mast assembly 406 includes an inner mast portion 438 and an outer mast portion 436 telescopically mounted to the inner mast portion 438. The outer mast portion 436 is adapted to slide relative to the inner mast portion 438 along the longitudinal axis 422 of the mast assembly 406. Preferably, the mast portions 436 and 438 are fabricated from hollow, structural steel members of generally, square-shaped cross-section. However, in alternative applications structural steel members having other cross-sections could be used, for instance, those having circular or rectangular cross-sections.

The inner mast portion 438 has a proximal end 440 for positioning into the internal compartment 418 of the base 404, and a distal end 442 for insertion within the hollow 443 of outer mast portion 436. Welded to the proximal end 440 of the inner mast portion 438 is a circular flange member 444. The circular flange member 444 has a plurality of threaded studs 446 for fastening to the circular flange plate 432. The circular flange member 444 is fixedly secured to the rotational motion actuator 420 with a plurality of bolts 448 thereby allowing the torque generated by the rotational motion actuator 420 to be transmitted to the mast assembly 406. A central aperture (not shown) in the circular flange member allows power feed lines to be run into and through the mast assembly 406 and into the boom 408.

In this embodiment, the rotational motion actuator 420 includes a swing drive assembly 450 of the kind generally known in the art. Referring to FIGS. 15 and 16, the swing drive assembly 450 has a base plate 452 fixed to the bottom wall 414 of the base 404, a slewing ring 454 supported on the base plate 452 and a rotatable screw or worm 456 housed within a worm housing 457. The worm 456 is adapted for meshing engagement with the slewing ring 454. The slewing ring 454 includes an outer ring portion 458 rotatably mounted about an inner ring portion 459. The outer ring portion 458 has a plurality of radially outwardly extending teeth 460 which are adapted to mesh with the thread (not shown) of the worm 456. A drive motor 462 mounted within the internal compartment 418, is operatively connected to the worm 456 by way of a reduction gearbox 464. Power is supplied to the drive motor 462 through feed lines 465. When the drive motor 462 is actuated, the worm 456 is urged to turn causing the thread of the worm 456 to mesh with teeth 460 of the outer ring portion 458. As a result, the outer ring portion 458 itself is urged to rotate. This rotational motion is ultimately transmitted to the mast assembly 406 and boom 408.

For reasons of convenience and safety, it is preferred that drive motor 462 be pneumatically-actuated through pneumatic feed lines 465. In particular, pneumatic-based systems tend not to pose substantial safety or environmental risks. For instance, where pneumatic systems are used, concern about contamination of the bales or the creation of a fire hazard in the event of an equipment malfunction or a rupture in the feed lines, tends to be minimal.

Actuators using an alternate power source could, however, be used if desired. For instance, the rotational motion actuator could be electrically powered (i.e. provided with an electric drive motor). Moreover, while hydraulically powered actuators could also be employed, they would likely not be favored because of the heightened risk of environmental contamination and fire hazard. A leak or rupture in the hydraulic feed lines of such an actuator could spread hydraulic fluid over the bale handling site (for instance, a barn) thereby contaminating bales and creating a potential ignition hazard.

In this embodiment, the mast assembly 406 is operatively connected to the rotational motion actuator 420 in such a manner that the mast assembly 406 is urged to rotate when the actuator is powered. It will be appreciated that other actuator configurations are also possible. For instance, by placing the actuator at the point of connection between the boom and the mast assembly, it may be possible to have the mast assembly remain rotationally constrained and instead have the boom rotate about the longitudinal axis of the mast assembly.

Referring to FIG. 17, a vertical displacement actuator 468 is provided to urge the outer mast portion 436 to slideably move relative to the inner mast portion 438 and consequently move the boom 408 between a raised position 466 (shown in FIG. 28a) and a lowered position 467 (shown in FIG. 28b) relative to the base 404. In contrast to the actuator 32 of bale handling and moistening apparatus 10 shown in FIG. 1, the vertical displacement actuator 468 is not mounted alongside the mast assembly nor is it exposed to the environment. In this embodiment, the vertical displacement actuator 468 is disposed within the mast assembly 406. More specifically, the actuator 468 is housed within the hollow 470 defined by the walls of the inner mast portion 438. It will thus be appreciated that arranging the actuator in this manner makes efficient use of available space. Moreover, it tends to improve the overall safety and operation of the actuator 468 in that its moving parts are wholly enclosed in the mast assembly. The actuator 468 tends to be protected from dirt and debris that could interfere with its operation. The risk of accidental contact with the actuator 468 by a worker or operator tends also to be substantially lessened.

The vertical displacement actuator 468 includes a pneumatic piston 472 that has a cylinder portion 474 and an extendable piston rod 476. When positioned within the hollow 470 of the inner mast portion 438, the cylinder portion 474 is supported by the circular flange member 444. This need not be the case in every application. In an alternative embodiment, the cylinder portion may be carried by one of the walls of the inner mast portion at a location above the flange member.

A pneumatic feed line 478 extending into hollow 470 supplies power to the cylinder portion 474. The piston rod 476 extends upwardly and away from the cylinder portion 474, its terminal end attached to the outer mast portion 436. By adjusting the pneumatic pressure within the cylinder portion 474, the piston rod 476 may be moved between a retracted position and an extended position to selectively extend or collapse the outer mast portion 436 in relation to the inner mast portion 438 to thereby cause the boom 408 to be raised or lowered relative to the base 404. Other actuators could also be used, for instance, electrically powered actuators. Moreover, while the vertical displacement actuator could employ a hydraulic piston instead of a pneumatic piston, this is not preferred for reasons of convenience and safety.

To ensure that the outer mast portion 436 travels smoothly over the inner mast portion 438, the mast assembly 406 is provided with roller means 480 and a plurality of self-lubricating wear plates 482 mounted to the mast portions 436 and 438. The roller means 480 includes two pairs 484 and 486 of spaced apart, cam roller assemblies 488. Each cam roller assembly 488 includes a roller 490 rotatably mounted on an axle 492. The axle 492 is carried by a bracket member 494 that is attached to a side wall of one of the outer and inner mast portions 436 and 438.

The first pair 484 of cam roller assemblies is mounted at the distal end 442 of the inner mast potion 438 and positioned so as to rollingly engage one of the interior side walls of the outer mast portion 436, when the mast assembly 406 is assembled. Proximate the first pair 484 of cam roller assemblies, the inner mast portion 438 has fastened to each of its external walls the self-lubricating wear plate 482. The second pair 486 of cam roller assemblies is similarly mounted at the lower end 496 of the outer mast portion 436. However, in this case the second pair 486 of roller assemblies is disposed so that the rollers 490 rollingly engage the exterior side wall of the inner mast portion 438, when the mast assembly 406 is assembled. The outer mast portion 436 is also provided with self-lubricating wear plates 482, but these are fastened to the interior walls of the outer mast portion 436 for sliding contact with the inner mast portion 438.

As shown in FIG. 15, the first pair 484 of roller assemblies is mounted opposite the second pair 486. This foregoing arrangement of roller assemblies 488 and wear plates 482 tends to promote a more balanced motion and tends to generally improve the stability of the mast assembly 406. It will be appreciated that other arrangements, such as, for instance, linear bearing arrangements, could also be used to similar advantage.

Figure 28A:
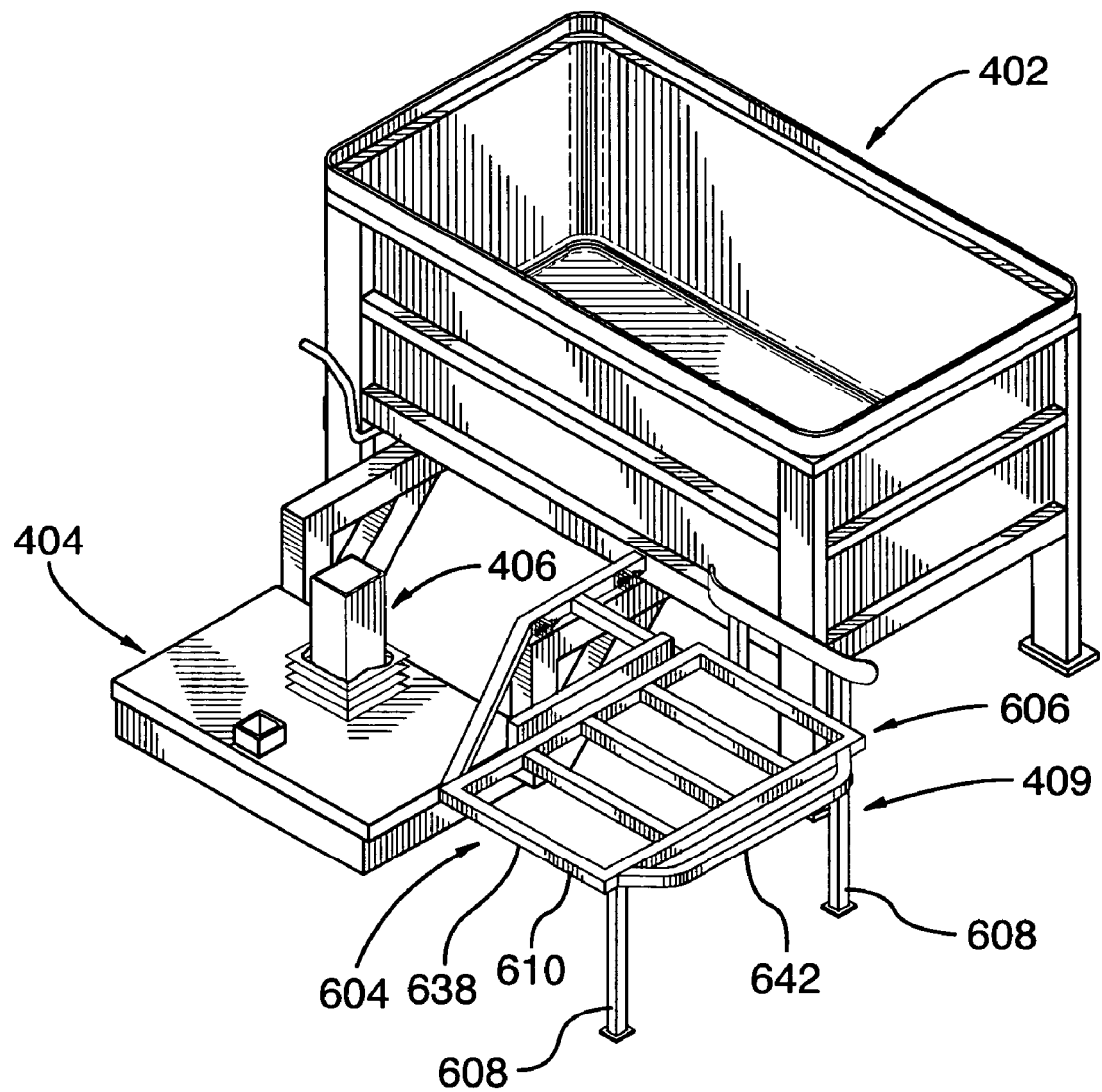
FIG. 28a is a partial, perspective view of the bale positioning device of FIG. 27, shown in its in-use position.
Figure 28B:
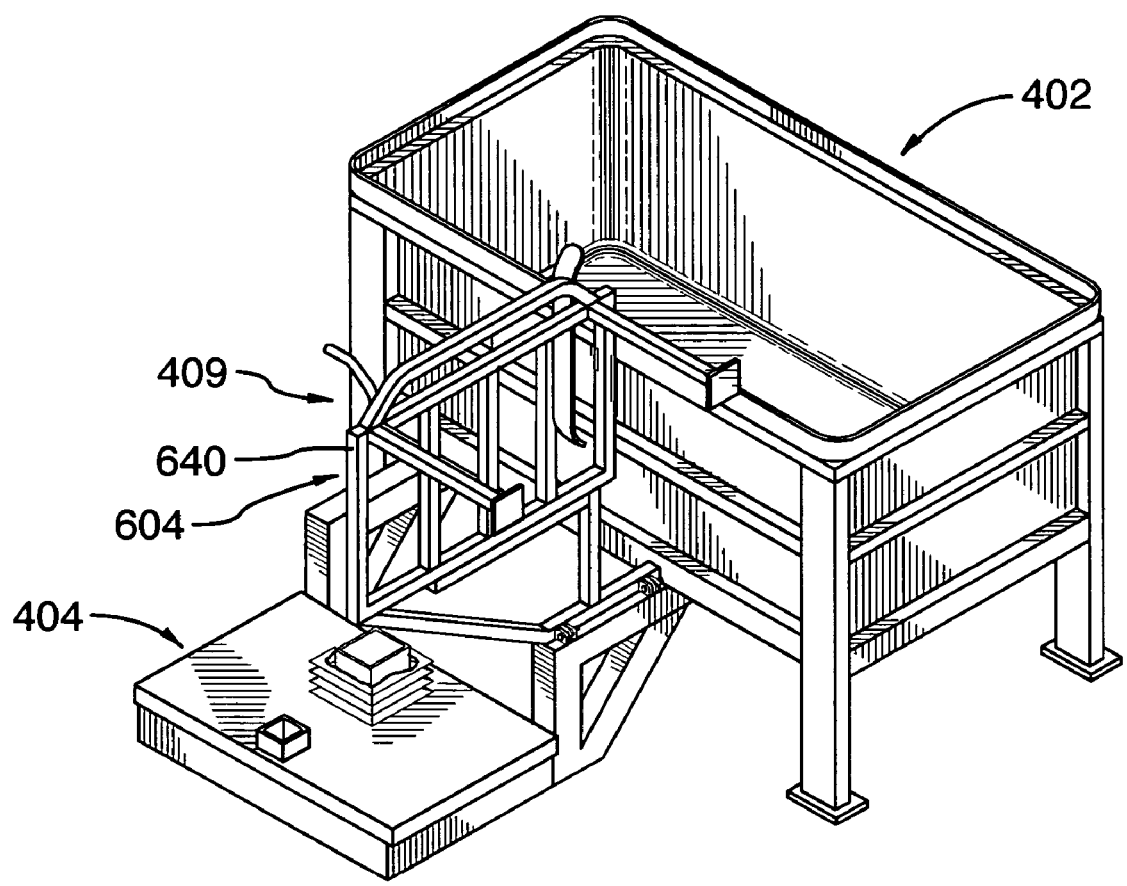
FIG. 28b is a view similar to that illustrated in FIG. 28a showing the bale positioning device in its out-of-use position.

The mast assembly 406 is further provided with a resilient, elongate, bellows member 498 that fits over, and shrouds, the inner mast portion 438. The bellows member 498 is attached at one end to the lower end 496 of the outer mast portion 436 by way of a generally square fitting 500. At the opposite end, the bellows member is connected to the apertured circular plate 432. The bellows member 498 is moveable between an expanded position 502 (as best shown in FIG. 28a) and a retracted position 504 (as best shown in FIG. 28b). When the outer mast portion 436 is urged to move upwardly and away from the inner mast portion 438 thereby causing the boom 408 to be raised, the bellows member 498 extends to its expanded position 502. Conversely, when the boom 408 is lowered, the bellows member 498 moves its retracted position. The bellows member 498 tends to serve a dual protective function. It tends to keep dirt and loose hay stalks from getting lodged between the mast portions 436 and 438 and generally interfering with operation of the apparatus 400. Moreover, by shrouding the interface area of the mast portions 436 and 438, the bellows member 498 tends to reduce the likelihood of an occurrence of a work-related accident (for instance, fingers or clothing getting caught between the moving parts), thereby improving the overall safety of apparatus 400.

Figure 19:
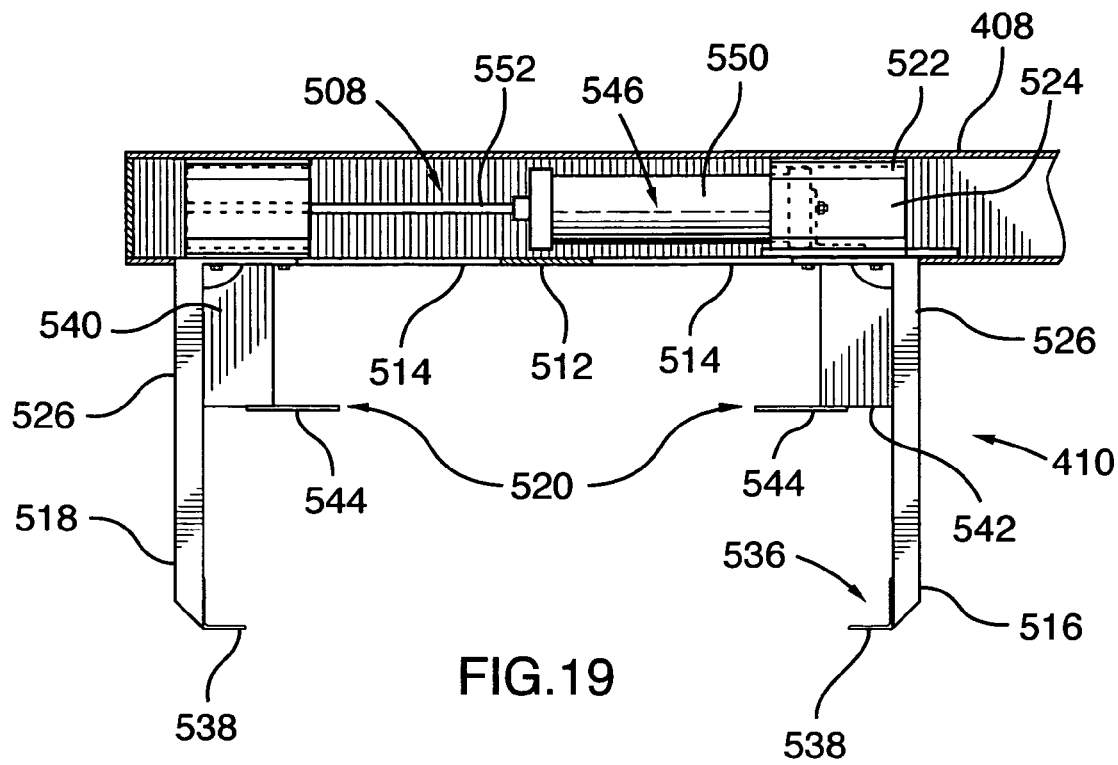
FIG. 19 is a partial, cross-sectional view of the bale gripping device of the bale moistening and handling apparatus shown in FIG. 14, illustrating the pneumatic actuator and the pair of gripping arm assemblies shown fully spread apart.

Referring to FIGS. 14 and 19, the boom 408 is mounted to the outer mast portion 436 in cantilevered fashion. More specifically, the boom 408 and the outer mast portion 436 are fastened to each other with screws, bolts, or the like, along a mitre joint designated generally with reference numeral 506. Alternatively, it is contemplated that the boom and the outer mast portion could be connected by way of a hollow, right angle, elbow or corner fitting, preferably, fabricated from cast iron. Connecting the boom to the outer mast portion in this manner would likely be easier and less costly to manufacture.

In similar fashion to the mast portions 436 and 438, the boom 408 is preferably fabricated from a hollow, structural steel member of generally, square-shaped cross-section. The side walls of the boom 408 define a hollow 508 that accommodates a portion of the bale gripping device 410. Cut out of the downwardly facing side wall 512 of the boom 408 are a pair of spaced apart, elongate slots 514. As will be explained below in greater detail, the slots 514 permit portions of the bale gripping device 410 to depend downwardly from the boom 408 to engage the bales 401.

The bale gripping device 410 is generally similar to bale gripping device 37 shown in FIG. 1 in that it also includes a pair of first and second, opposed gripping arm assemblies 516 and 518, respectively, and a bale guide 520 disposed between the gripping arm assemblies 516 and 518. The bale gripping device 410 is configured so as to abut at least three faces of a generally rectangular bale. Where, like in this embodiment, the bale gripping device 410 is used to handle two abutting bales 401, the bale gripping device 410 will engage the top surfaces of each bale 401 and one side face of each respective bale 401. It will thus be appreciated that the bale gripping device 401 grips the two, relatively small, bales 401 in much the same manner as it would one large bale of generally equal size.

In this embodiment, both gripping arm assemblies 516 and 518 are slideably moveable in relation to the boom 408 are generally similar to each other such that the description of the former shall suffice for the latter. Gripping arm assembly 516 includes a generally square, slide block 522 sized to fit within the hollow 508 of boom 408. The slide block 522 is outfitted with a plurality of self-lubricating wear plates 524 (similar to wear plates 482) secured to each side wall thereof to encourage smooth travel of the slide block 522 within the boom 408. In contrast to the generally exposed sliding arrangement used for the slidable bale gripping arm 36 shown in FIG. 1, the sliding arrangement employed in this embodiment is neatly contained within the boom 408.

Figure 18:
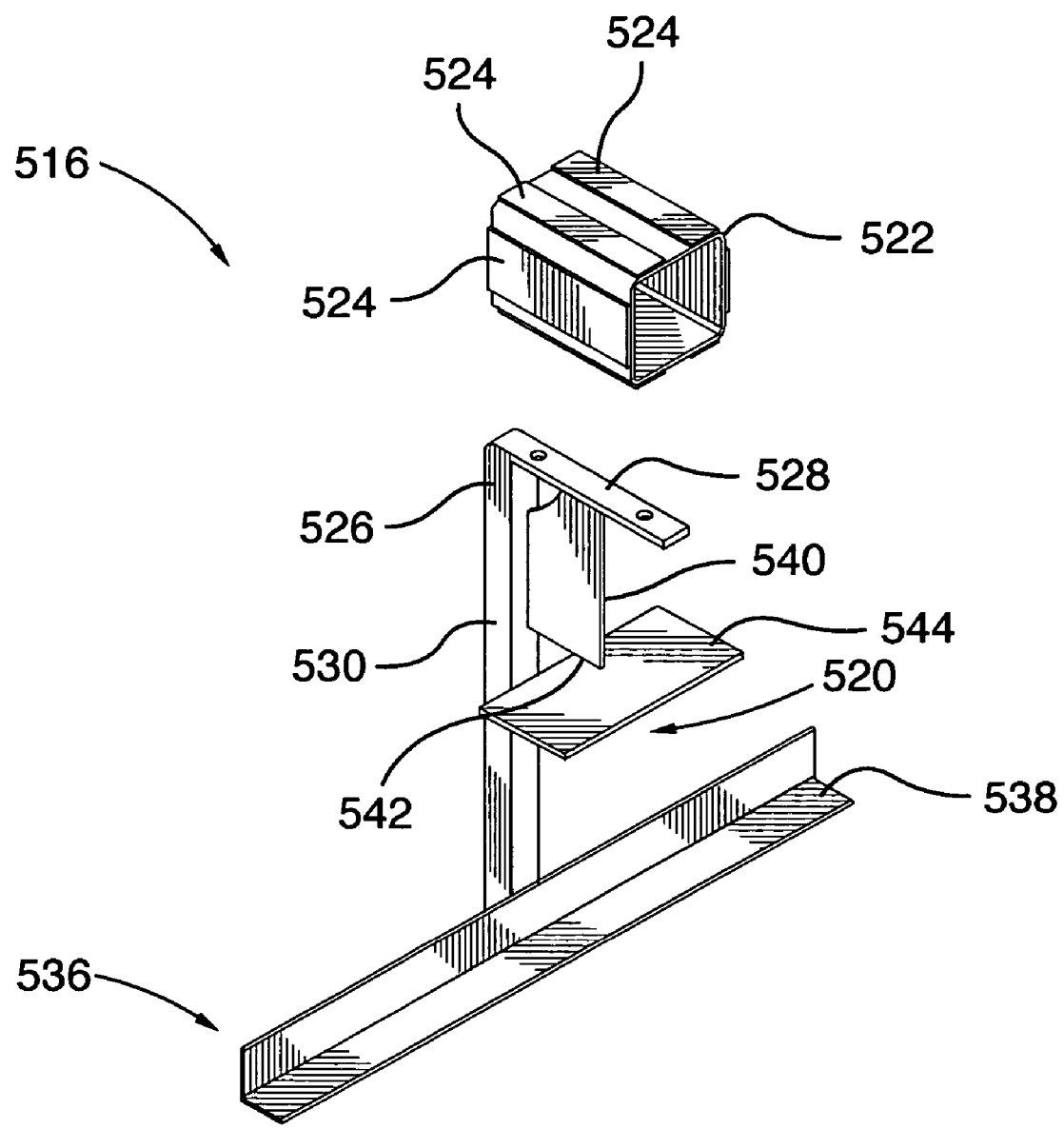
FIG. 18 is an isolated, side elevation view of a gripping arm assembly from the bale gripping device of the bale moistening and handling apparatus shown in FIG. 14.

Referring specifically to FIGS. 18 and 19, gripping arm assembly 516 further includes a generally L-shaped bracket member 526 having a short leg 528 and a long leg 530. Short leg 528 is fastened to the underside of the slide block 522 while the long leg 530 extends downwardly from the hollow 508 and through slot 514 defined in the boom 408. Welded to the free end 534 of long leg 530 is a gripping member 536 in the nature of a generally L-shaped angle rod 538 disposed generally crosswise of the long leg 530. Preferably, the gripping members are fabricated from stainless steel or the like metal exhibiting similar strength and corrosion resistant properties.

While in this embodiment, the gripping members are L-shaped, alternatively, the gripping member could be configured differently. For instance, the gripping member could be angled downwardly. In a further alternative embodiment, the gripping member could be provided with a friction enhancing textured surface or one or more teeth, hooks, barbs, spikes or the like to enhance the gripping characteristics of the gripping members.

A gusset member 540 welded between legs 528 and 530 reinforces the bracket 526. The gusset member 540 extends part way down the long leg 530 and has welded to its lowermost edge 542 a transverse guide plate 544. In this embodiment, the bale guide 510 is embodied in the transverse guide plates 544 welded to the long legs of each bracket 526. It will thus be appreciated that each gripping arm assembly 516, 518 is provided with its own means for maintaining bales 401 submerged in the tank 402. Unlike the bale guide 40 shown in FIG. 1, bale guide 510 is not attached to the boom 408 but rather each transverse guide plate 544 is fixed to a respective gripping arm assembly 516, 518. As with the gripping members 536, the transverse guide plates are preferably fabricated from stainless steel or the like metal exhibiting similar strength and corrosion resistant properties.

If desired, in an alternative embodiment, the transverse guide plates could be replaced with similarly oriented guide members of a different configuration. Other modifications are also possible. For instance, in another embodiment, the guide plates could be designed for vertical displacement to allow adjustment for different size bales. In such an embodiment, the positioning of the guide plates relative to gripping arm assemblies could be actuated with small pneumatic cylinders.

Figure 20:
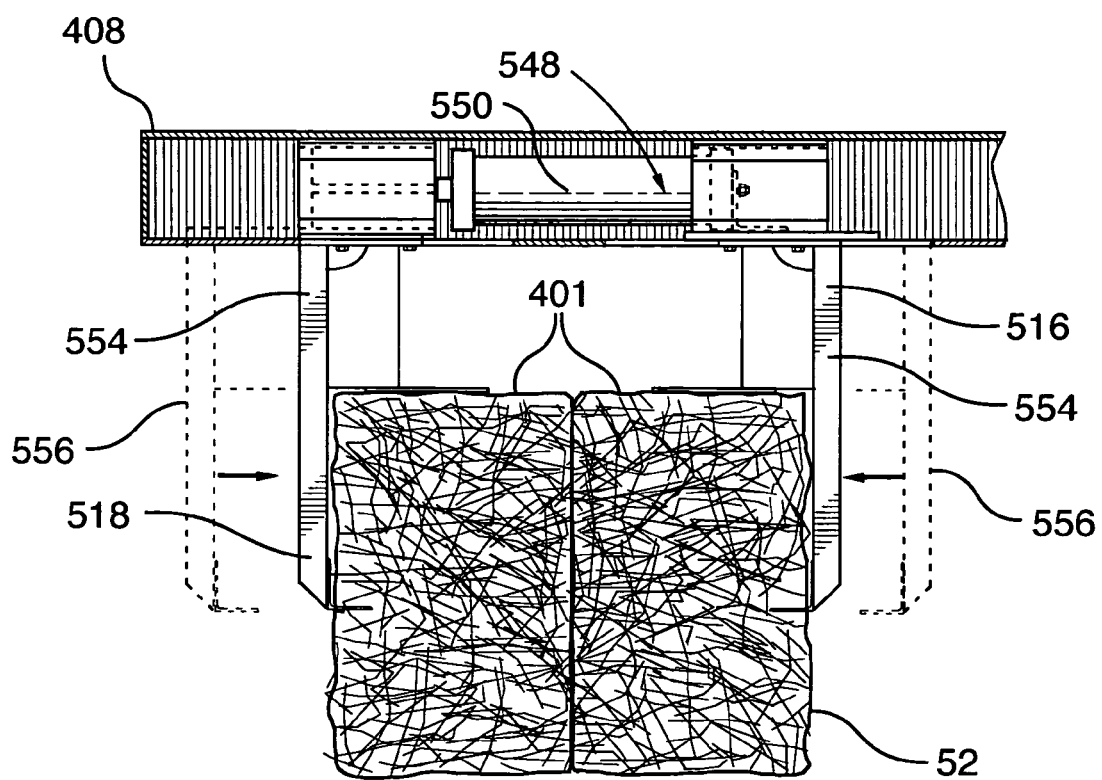
FIG. 20 is a view similar to that shown in FIG. 19, illustrating the pneumatic actuator, and the pair of gripping arm assemblies shown holding a bale.
Figure 21:
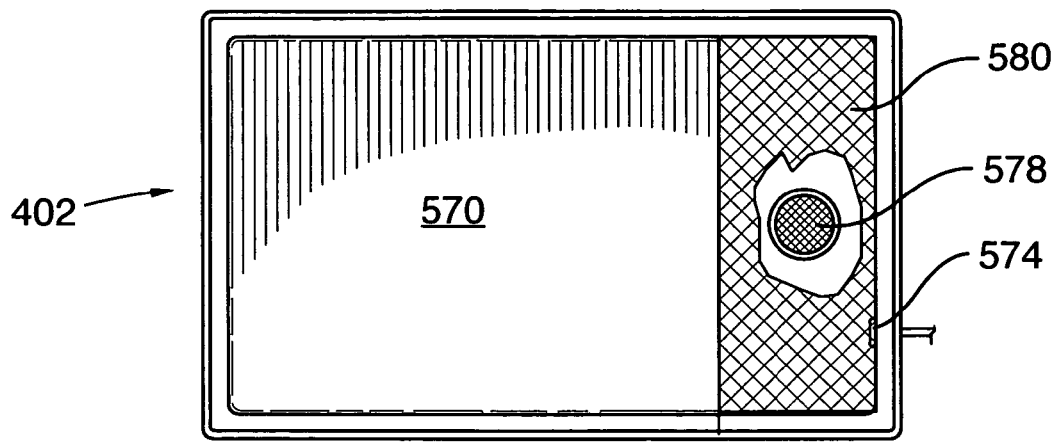
FIG. 21 is a top plan view of the tank of the bale moistening and handling apparatus shown in FIG. 13.
Figure 22:
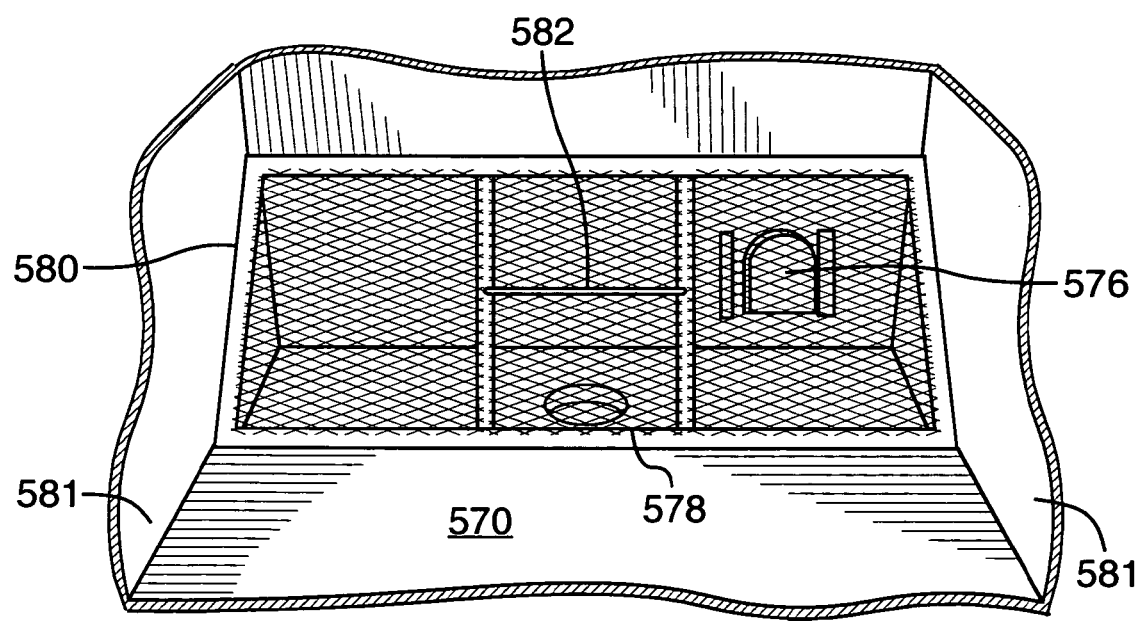
FIG. 22 is an enlarged, partial perspective view of the tank illustrated in FIG. 21 showing the removable drain screen mounted within the container of the tank.
Figure 23:
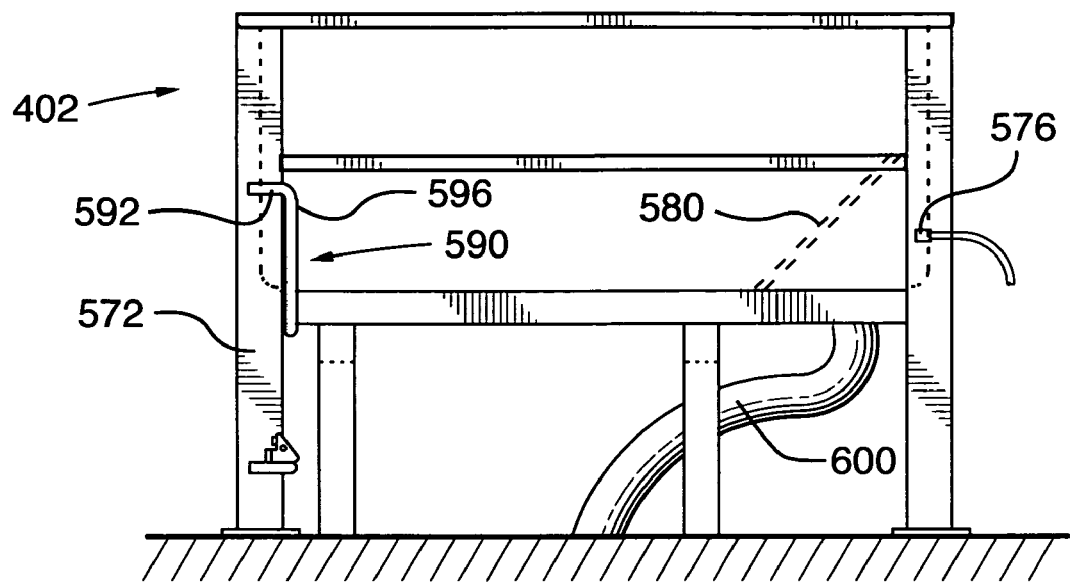
FIG. 23 is a partial cross-sectional view of the tank illustrated in FIG. 21, with the tipping means shown in the disengaged position.
Figure 24:
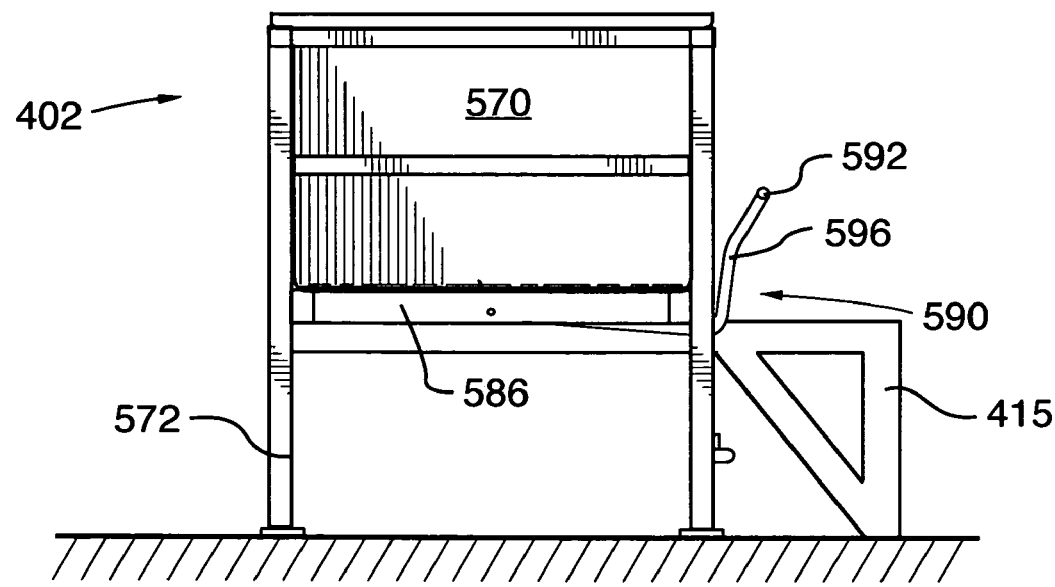
FIG. 24 is a left side elevation view of the tank shown in FIG. 23.
Figure 25:
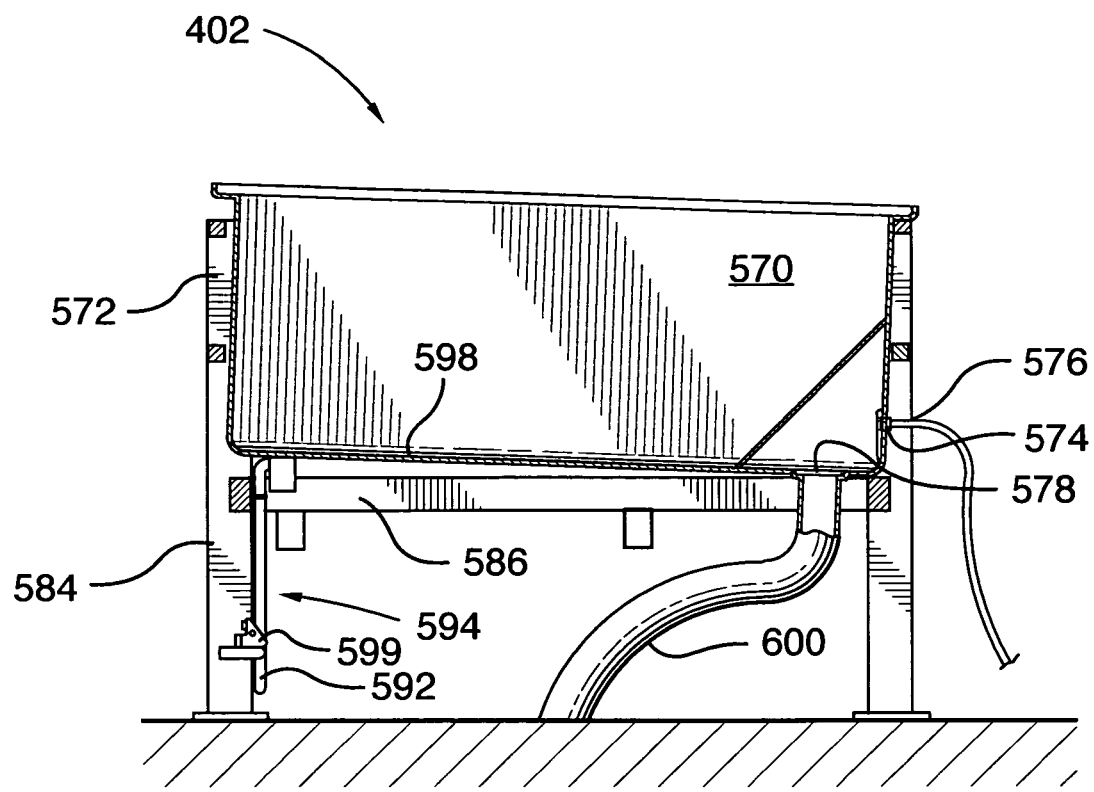
FIG. 25 is a view similar to that illustrated in FIG. 23, with the tipping means shown moved to the engaged, tipping position to facilitate draining of the tank.
Figure 26:
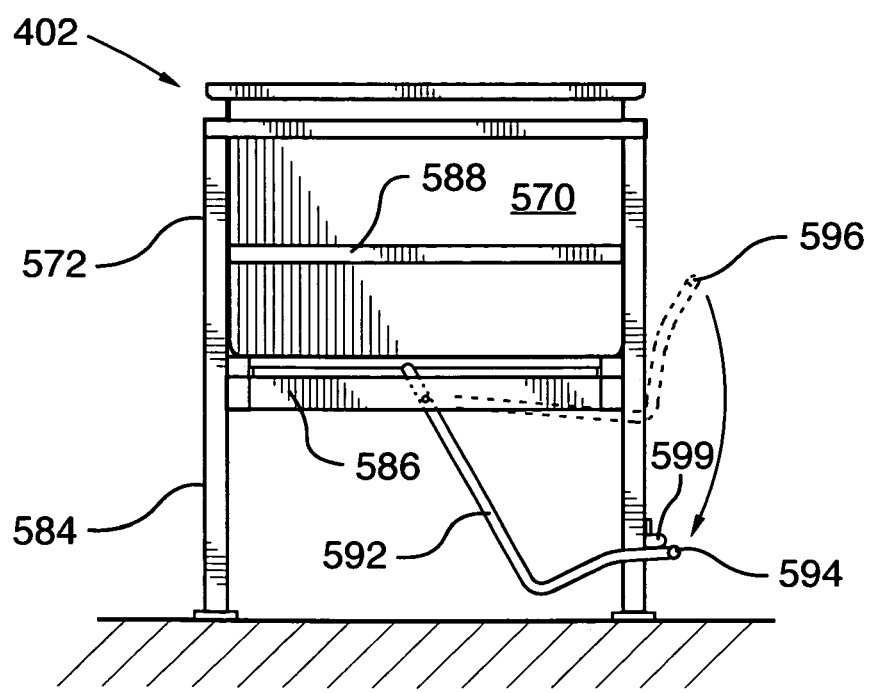
FIG. 26 is a left side elevation view of the tank shown in FIG. 25.

Referring to FIGS. 19 and 20, a bale gripping actuator 546 is provided to urge the gripping arm assemblies 516 and 518 to selectively move toward or away from each other to selectively grip or release bales 401. Unlike the actuator 46 of the slidable gripping arm 36 that is mounted alongside the boom, in this embodiment the bale gripping actuator 546 is disposed in the boom 408. More specifically, the actuator 546 is housed within the hollow 508 of the boom 408. As previously explained in connection with the vertical displacement actuator 468, this type of arrangement is advantageous because it tends to protect the actuator 546 from dirt or debris that could interfere with its operation. Moreover, it provides an added safety feature while making efficient use of available space.

The bale gripping actuator 546 includes a pneumatic piston 548 that has a cylinder portion 550 and an extendable piston rod 552. The cylinder portion 550 is connected to one gripping arm assembly 516 or 518 (as the case may be) while the extendable piston rod is connected to the other, opposite gripping arm assembly. A pneumatic feed line (not shown) extending from the base 404, up through the mast assembly 406 and into the boom 408 supplies power to the cylinder portion 550. A plastic, link-type, cable carrier (not shown) is used to protect the feed line and direct the latter through the mast assembly 406 and boom 408.

By adjusting the pneumatic pressure within the cylinder portion 550, the piston rod 552 may be retracted or extended to selectively move the gripping members 536 of the opposed gripping arm assemblies 516 and 518 between a gripping position 554 (shown in FIG. 19) and a release or fully spread apart, position 556 (shown in FIG. 20). When in the gripping position 554, the gripping arm assemblies 516 and 518 exert continuous pressure on the bales 401 held therebetween. This is particularly advantageous because it tends to ensure that the bales 401 continue to be firmly held even after the bales have been exposed to the conditioning liquid in the tank 402 wherein they may have changed shape.

The maximum travel of the gripping arm assemblies 516 and 518 (and their gripping members 536) towards or away from each other is constrained by the slots 514 formed in boom 408. The edges of the slots 514 tend to serve as stops preventing further travel of the slide blocks 522 within the boom 408.

In this embodiment, a single pneumatic piston 548 is employed to urge the gripping arm assemblies 516 and 518 towards or away from each other. This need not be the case in every application. In an alternative embodiment, it may be possible to provide one pneumatic piston for each gripping arm assembly 516, 518.

As mentioned in the context of the vertical displacement actuator, the bale gripping actuator could be electrically powered. Alternatively, a hydraulic piston could be used for the bale gripping actuator instead of a pneumatic piston, but this would generally not be preferred for reasons of convenience and safety.

In this embodiment, both gripping arm assemblies 516 and 518 are free to slide within the hollow 508 of the boom 408. However, it will be appreciated that this need not be the case in every application. In an alternative embodiment, one of the pair of gripping arm assemblies could be made slidable while the other could be made stationary, fixed in position within the boom. In such a case, the gripping arm actuator would urge the slidable gripping arm assembly towards, or away from, the stationary gripping arm assembly.

Control means 412 is generally similar to control means 16 of FIG. 1. As shown in FIG. 14, control means 412 includes a control console 560 supported on the pedestal 430. The control console 560 has a plurality of levers 562, 564 and 566 which control rotational motion actuator 420, vertical displacement actuator 468 and bale gripping actuator 546, respectively, by selectively opening and closing electronically actuated valves (not shown) to regulate the pneumatic pressure within the pneumatic feed lines 423. The pneumatic feed lines 423 run from within the internal compartment 418 of the base 404 and up through the pedestal 430 for operative connection to the valves and corresponding levers 562, 564 and 566.

Referring to FIGS. 13 and 21 to 26, tank 402 is generally similar to tank 14 shown in FIGS. 3 and 4 in that it includes a container 570 supported by a tank frame 572. The container 570 and tank frame 572 are of similar construction to container 60 and tank frame 54. Container 570 has an inlet 574 outfitted with a fill valve 576 to permit filling of the tank with water or another moistening, treating or conditioning liquid 20, and an outlet 578 for draining liquid 20 from the container 570. A removable drain screen 580 is mounted within the container 570 and sized to fit snugly between opposite side walls 581 of the container 570. Fabricated from metal mesh, the drain screen 580 is adapted to retain debris such as loose stalks of hay or the like, thereby discouraging clogging of the outlet 578 during routine cleaning and maintenance operations. When seen in side elevation view, the drain screen 580 has a profile generally similar to that of a right angle triangle. A handle 582 mounted to the drain screen facilitates removal of the drain screen 580 from the container 570. All fittings mounted within the container 570, such as the inlet 574, fill valve 576, outlet 578, drain screen 580 are preferably made of stainless steel or the like metal chosen for its corrosion resistant properties.

The tank frame 572 is constructed from structural steel members including upright post members 584, support cross-members 586 and additional reinforcement members 588. The container 570 rests upon support cross-members 586 which in turn are mounted on frame members 413. Optionally, the tank frame could include a catwalk (not shown) mounted in cantilevered fashion from the support cross-members 586. The catwalk could extend about a portion of, or the whole of, the periphery of the tank frame 572 and could provide improved access to the container 570 thereby facilitating the cleaning thereof.

In this embodiment, the tank frame 572 is fixed to the structural support surface or floor. More specifically, the feet of post members 584 are anchored to the floor. The tank frame however need not be fastened to the floor in every application.

The tank frame 572 has tipping means 590 adapted to tip one end of the container 570 to facilitate draining operations. In this embodiment, the tipping means 590 takes the form of a hand-actuated lever 592 pivotally mounted to one of the support cross-members 586 of the tank frame 572. The lever 592 is moveable between an engaged, tipping position 594 (shown in FIGS. 25 and 26) and a disengaged position 596 (shown in FIGS. 23 and 24). When in the engaged position 594, a portion of the lever is urged against base 598 of the container 570 thereby causing the container 570 to lift at one end. The resulting tilting action tends to urge the liquid 20 in the container 570 to flow towards the outlet 578 thereby expediting drainage of the liquid 20 from the container 570. A latch mechanism 599 is operable to maintain the lever 292 in the tipping position 594.

During a routine cleaning operation of the container 570, the liquid 20 in the container 570 is drained through outlet 578. Debris in the liquid being drained is collected by the drain screen 580. Once the container 570 has been nearly emptied, the tipping means 590 is actuated by moving the lever 592 to its tipping position 594. As the container 570 tilts, the liquid remaining in the container 570 is urged to flow toward the outlet 578 and out of the container 570 where it is carried away by a drainage conduit 600.

While in this embodiment the tipping means takes the form of a hand actuated lever, it will be appreciated that alternative tipping means could have been employed to similar advantage. For instance, the lever could be designed to be foot actuated (for example, by way of a pedal). Alternatively, the tipping means could rely on pneumatic, hydraulic or electric power. In the further alternative, the tipping means could be automated and operatively connected to the control means.

With reference to FIGS. 27, 28a, 28b and 29a-29d, there is shown bale positioning device 409 disposed to one side of base 404. In this embodiment, the bale positioning device 409 takes the form of a cradle 604 having a framework 606 raised relative to the floor. The framework 606 fabricated from a plurality of structural steel members welded together, is supported on a pair of spaced apart legs 608. Framework 606 includes a generally rectangular portion 610 having a pair of opposed, short sides 612 and 614 and a pair of opposed, long sides 616 and 618. The framework supporting legs 608 are fixed to rectangular portion 610 at the corners thereof formed by the juncture of long side 618 to short sides 612 and 614. Each of the long sides 616 and 618 has inner and outer telescopically mounted members (not shown) that allow their respective lengths to be adjusted (i.e. lengthened or shortened) to accommodate bales of varying sizes.

Extending between the pair of short sides 612 and 614 is a plurality of cross-members 620 which define a support 622 on which may be placed bales 401. When placed on the support 622, the bales 401 are carried at a predetermined height above the floor (see FIG. 30a). Having the bales 401 elevated off the floor is advantageous because it minimizes the distance separating the bale guide device 410 from the bales 401, thereby also minimizing travel of the outer mast portion 436 along the inner mast portion 438 during operation of the apparatus 400. This arrangement obviates the need to provide the vertical displacement actuator 468 with a pneumatic piston possessing a longer stroke length.

A pair of guardrails or guard members 624 and 626 is provided to bound bales 401 placed on support 622 on two sides thereof (see FIG. 29a). The guardrails 624 and 626 serve to prevent the bales 401 from extending beyond the edges of the support 622. More particularly, the guardrails 624 and 626 tend to encourage the proper positioning of the bales 401 so that they may be easily handled by the bale gripping device 410. In this embodiment, the guardrails 624 and 626 are carried at a fixed height above the support 622. Moreover, the first guardrail 624 extends along the short side 614 while the second guide member 626 extends along the long side 616.

It will be appreciated that in alternative embodiments, the guardrails could be configured differently. For instance, the guardrails could be disposed on different sides of the rectangular portion. Alternatively, additional guardrails could be included. In a further alternative embodiment, one or more of the guardrails could be adjustable to accommodate bales of different sizes. For instance, the height at which the guardrail is carried could be selectively raised or lowered as desired.

Figure 27:
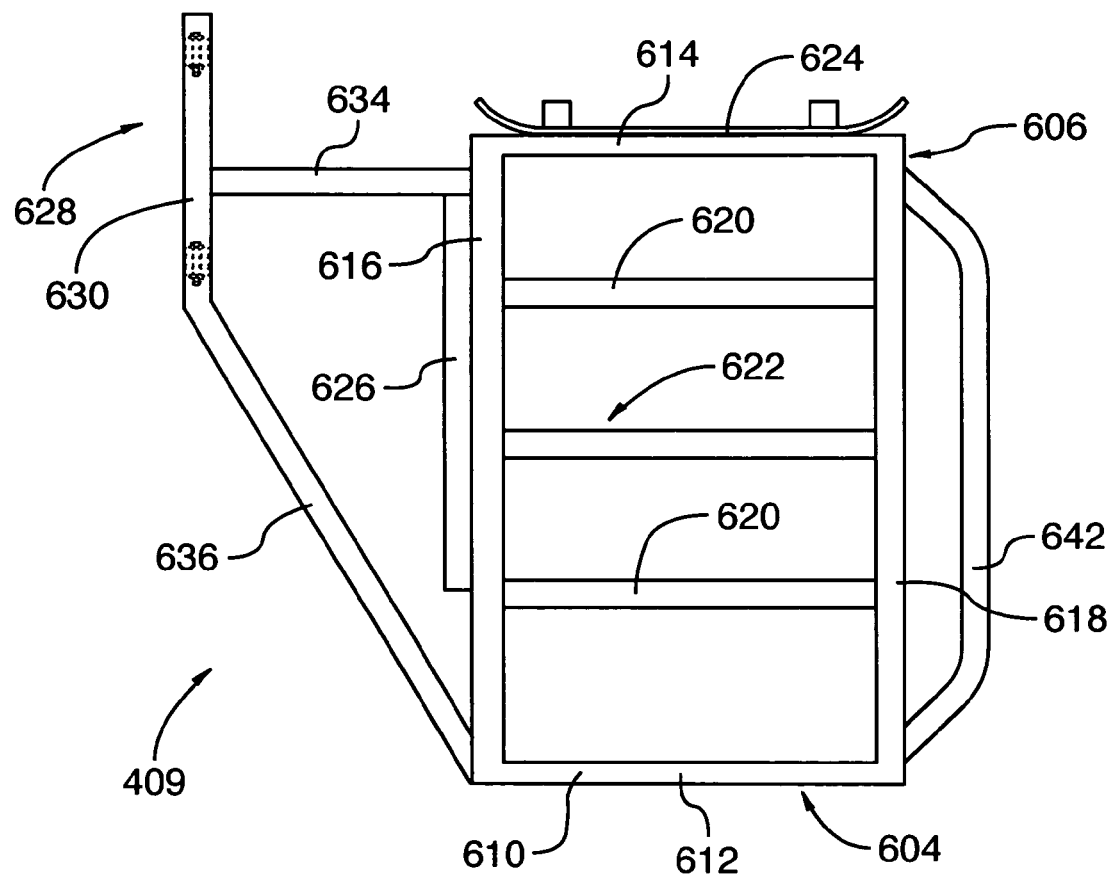
FIG. 27 is an isolated plan view of the bale positioning device of the bale moistening and handling apparatus of FIG. 13.

As shown in FIGS. 27, 28a and 28b, the rectangular portion 610 is connected to frame member 413 by of a bracket 628. Bracket 628 has a generally elongate member 630 hingedly mounted to the horizontal leg 632 of knee member 415 at two locations. Bracket 628 further includes a first arm 634 mounted to, and extending generally transverse of, the elongate member 630, and a second arm 636 extending generally diagonally from an end of the elongate member 630. Both arms 632 and 634 are welded to the long side 616 of the rectangular portion 610. The first arm 632 is joined to the long side 616 adjacent the corner formed by the juncture of long side 616 to short side 614 whereas the second arm 636 is attached to the opposite corner formed by the juncture of long side 616 to short side 612.

The hinge connection between horizontal leg 632 and elongate member 630 allows the cradle 604 to be pivoted between an in-use position 638 (shown in FIG. 28a) and an out-of-use position 640 (shown in FIG. 28b). A handle member 642 welded to long side 614 of rectangular portion 610 facilitates pivotal movement of the cradle 604 between positions 638 and 640. When moving the cradle 604 to the out-of use position 640, the support 622 moves from a position where it is substantially parallel to the floor to one where it is substantially perpendicular thereto, leaving the space immediately below the support 622 easily accessible to allow for sweeping, cleaning or other maintenance related activities.

In this configuration, the position of the cradle 604 (when in its in-use position 638) relative to base 404 is generally predetermined and fixed. This relationship is advantageous because it obviates the need to constantly re-position the cradle 604 (and correspondingly the bales 401 placed thereon) to allow the bale gripping device 410 to handle the bales 401. Bale handling and moistening operations are thereby facilitated.

While in this embodiment, the fixed positional relationship of the cradle 604 relative to the base 404 is made possible by mounting the cradle 604 to the frame member 413, it will be appreciated that this result may be achieved in other ways. For instance, in an alternative embodiment, the cradle 604 could be attached directly to the base 404 or anchored to the floor.

Operation of the bale moistening and handling apparatus 400 will now be described in greater detail with reference to FIGS. 29a to 29d and FIGS. 30a to 30g. A pair of bales 401 to be moistened is placed on the cradle 604 and urged in a first position 644 for handling by the bale gripping device 410. More specifically, in the first position 644, each bale 401 is disposed so that one of its respective faces (defined by its depth D and length L parameters) rests on support 622 of cradle 604 and another of its respective faces (defined by its depth D and width W parameters) abuts the first guardrail 624. The bales 401 abut along one of their respective faces (defined by their width W and length L parameters). The second guardrail abuts the face (defined the width W and length L parameters) of one of the bale members 401. While preferred, the bales 401 need not be positioned in this manner in every application. They may be oriented differently along their respective faces.

Prior to actuation of the apparatus 400, the boom 408 is in at its raised position 466 suspended over the tank 404 and the gripping arm assemblies are in the release position 556 (see FIG. 29a). The rotational motion actuator 420 is engaged and urges the mast assembly 406 to rotate about its longitudinal axis 422 to thereby position the boom 408 and the bale gripping device 410 directly over the bales 401 and the cradle 604 (see FIGS. 29b and 30a). The vertical displacement actuator 468 is now engaged and the outer mast portion 436 is urged to telescopically collapse onto the inner mast portion 436 causing the boom 408 to move toward its lowered position 467. The transverse guide plates 544 are urged to abut the top faces of the bales 401 and the gripping arm assemblies 516 and 518 are moved to their gripping position 554 (see FIG. 30b). It will thus be appreciated that in this embodiment the bales 401 are being gripped across their respective depth D parameters. As previously mentioned, while this is preferred it need not be the case in every application.

The bales 401 are now ready to be moved to a second position 646. With bales 401 firmly held between the gripping members 536 of the assemblies 516 and 518, the boom 408 is moved towards its raised position 466 (see FIG. 30c) and the mast assembly 406 is rotated so that the boom 408 and the bale handling device 410 are positioned directly over the tank 402 (see FIGS. 29c and 30d). Subsequently, the boom 408 is moved toward its lowered position 467 and the bale gripping device 410 holding the bales 401 is submerged in the liquid 20 in the container 570 (see FIG. 30e). The bales 401 remain submerged in the container 570 for a predetermined period of time so as to allow the bale to be thoroughly moistened. Thereafter, the boom 408 is raised over the tank 402 thereby permitting the excess liquid to be drained from the now moistened bales 401.

In the final steps of this operating sequence, the now moistened bales 401 are moved to a third position 648 which in this case is the load bearing surface 650 of a wheeled cart 652 or other similar transport vehicle. More specifically, the mast assembly 406 is rotated such that the moistened bales 401 are positioned directly over the load bearing surface 650 (see FIGS. 29d and 30f). The boom 408 is lowered until the bales 401 rest on the loading bearing surface 650 of the cart 652 (see FIG. 30g). The bales 401 are then released by the gripping members 536 of the assemblies 516 and 518. The foregoing operation may be repeated and additional bales 401 may be stacked onto to cart 652.

The foregoing description recounts a typical operation as it pertains to moistening and handling two bales 401 simultaneously. It will be appreciated that a single bale may also be moistened and handled using the foregoing method with appropriate modification.

Although the foregoing description and accompanying drawings relate to specific preferred embodiments of the present invention and specific methods of handling and moistening bales as presently contemplated by the inventor, it will be understood that various changes, modifications and adaptations, may be made without departing from the spirit of the invention.

The embodiments of the invention in which an exclusive property or privilege is claimed are defined as follows:

1. An apparatus for moistening and handling at least one bale, comprising:
   an open-topped tank for containing a liquid for moistening the at least one bale;
   a base;
   a mast assembly extending upwardly from said base, said mast assembly being rotatable about its longitudinal axis;
   a boom carried by said mast assembly, said boom being moveable between a lowered position and a raised position relative to said base and said boom having a longitudinal axis; and
   a bale gripping device depending from said boom, said bale gripping device including a bale guide for maintaining the at least one bale engaged in a submerged position within said tank to facilitate moistening of the at least one bale; said bale guide being moveable relative to said boom and being adapted to travel longitudinally along said boom.

2. The apparatus of claim 1 further comprising control means for operating said bale gripping device, and said mast assembly.

3. The apparatus of claim 2 wherein said control means includes a programmable logic controller.

4. The apparatus of claim 2 wherein said tank and said control means are mounted onto said base.

5. The apparatus of claim 1 wherein:
   said mast assembly includes an inner mast portion and an outer mast portion concentrically mounted about said inner mast portion, said outer mast portion being slideably moveable relative to said inner mast portion along said longitudinal axis; and said boom is mounted to said outer mast portion.

6. The apparatus of claim 5 wherein said boom is attached to said outer mast portion in a cantilevered fashion.

7. The apparatus of claim 5 wherein said outer mast portion is telescopically mounted to said inner mast portion.

8. The apparatus of claim 5 further comprising a first actuator to urge said outer mast portion to slide relative to said inner mast portion, and a second actuator to urge said mast assembly to rotate about its longitudinal axis.

9. The apparatus of claim 8 wherein said first and second actuators are hydraulic in nature.

10. The apparatus of claim 8 wherein the first actuator is an actuator selected from the group consisting of: (a) a hydraulic actuator; (b) a pneumatic actuator; and (c) an electrical actuator.

11. The apparatus of claim 8 wherein the first actuator is hydraulic in nature.

12. The apparatus of claim 11 wherein said first actuator includes a hydraulic piston disposed alongside said mast assembly.

13. The apparatus of claim 12 wherein the hydraulic piston includes a cylinder connected to said second actuator and a piston rod extending from said cylinder and fixed to said outer mast portion.

14. The apparatus of claim 8 wherein said first actuator is disposed within the mast assembly.

15. The apparatus of claim 14 wherein said first actuator is pneumatic in nature.

16. The apparatus of claim 15 wherein said first actuator includes a pneumatic piston having a cylinder disposed within said inner mast portion and a piston rod extending from said cylinder and attaching to said outer mast portion for imparting longitudinal motion to said outer mast portion when said pneumatic piston is actuated.

17. The apparatus of claim 8 wherein said first and second actuators are pneumatic in nature.

18. The apparatus of claim 8 wherein said first actuator is manually operated.

19. The apparatus of claim 17 wherein the first actuator includes means selected from the group consisting of: (a) rack and pinion means; and (b) cable and hand winch means.

20. The apparatus of claim 8 wherein said second actuator is hydraulic in nature.

21. The apparatus of claim 20 wherein said second actuator includes a hydraulic chain drive operatively connected to said inner mast portion, said hydraulic chain drive being mounted onto said base.

22. The apparatus of claim 8 wherein the second actuator is manually operated.

23. The apparatus of claim 22 wherein the second actuator includes hand crank and worm gear means.

24. The apparatus of claim 8 wherein said second actuator is pneumatic in nature.

25. The apparatus of claim 24 wherein said second actuator includes a swing drive assembly connected to said inner mast portion, and a pneumatically powered motor for driving said swing drive assembly.

26. The apparatus of claim 25 wherein said swing drive assembly and said pneumatically powered motor are housed within said base.

27. The apparatus of claim 1 wherein:

the at least one bale is generally rectangular and has plurality of sides; and the bale gripping device is configured so as to abut at least three sides of the rectangular bale.

28. The apparatus of claim 1 wherein:

said bale gripping device includes a pair of first and second, opposed, gripping arm assemblies; and said bale guide is disposed between said first and second gripping arm assemblies.

29. The apparatus of claim 1 wherein:

said bale gripping device includes a pair of first and second, opposed, gripping arm assemblies;

said bale guide is disposed between said first and second gripping arm assemblies and includes at least one guide plate carried by one of the gripping arm assemblies.

30. The apparatus of claim 29 wherein said bale guide includes a pair of first and second guide plates each mounted to the respective first and second gripping arm assemblies.

31. The apparatus of claim 28 wherein said first gripping arm assembly is moveable relative to said boom.

32. The apparatus of claim 31 wherein said first gripping arm assembly includes a sleeve member mounted in surrounding relation to said boom, and a gripping member downwardly depending from said sleeve member.

33. The apparatus of claim 32 wherein said gripping member is generally L-shaped.

34. The apparatus of claim 32 further comprising an actuator for urging said sleeve member to slide relative to said boom.

35. The apparatus of claim 34 wherein said actuator is hydraulic in nature.

36. The apparatus of claim 31 wherein said second gripping arm assembly includes a gripping member mounted for pivotal rotation about said boom.

37. The apparatus of claim 31 wherein said gripping member is L-shaped.

38. The apparatus of claim 31 further comprising an actuator for urging said gripping member of said second gripping arm assembly to pivot about said boom.

39. The apparatus of claim 38 wherein said actuator is hydraulic in nature.

40. The apparatus of claim 28 wherein both said first and second gripping arm assemblies are slidablely moveable relative to said boom.

41. The apparatus of claim 40 wherein each of said gripping arm assemblies includes a sleeve member mounted in surrounding relation to said boom, and a gripping member downwardly depending from said sleeve member.

42. The apparatus of claim 41 further comprising a manually operated actuator for urging said sleeve members of said gripping arm assemblies to slide in relation to said boom.

43. The apparatus of claim 42 wherein the manually operated actuator includes crank and screw means.

44. The apparatus of claim 31 wherein said first gripping arm assembly includes:

a slide block for placement within said boom, a bracket depending from said slide block, the bracket having a proximal end connected to said slide block and a free end; and a gripping member mounted to said free end of said bracket.

45. The apparatus of claim 44 wherein said bale guide includes a guide plate for abutting a top surface of the bale, the guide plate being carried by said bracket.

46. The apparatus of claim 45 wherein the first gripping arm assembly further includes a gusset reinforcing said bracket, said guide plate being fastened to said gusset.

47. The apparatus of claim 44 wherein said gripping member has grip enhancing means.

48. The apparatus of claim 47 wherein said grip enhancing means is selected from the group consisting of: (a) teeth; (b) hooks; (c) barbs; (d) spikes; and (e) a friction enhancing textured surface.

49. The apparatus of claim 44 further comprising an actuator disposed within said boom for urging said slide block to move in relation to said boom.

50. The apparatus of claim 49 wherein the actuator is pneumatic in nature.

51. The apparatus of claim 50 wherein said actuator includes a pneumatic piston having a cylinder and a piston rod extending from said cylinder, said cylinder being mounted to said slide block and said piston rod being attached to said second gripping arm assembly.

52. The apparatus of claim 51 wherein:
said second gripping arm assembly is moveable relative to said boom;
said second gripping arm assembly includes a second slide block for placement within said boom and a second gripping member attached to said second slide block;
said piston rod being connected to said second slide block.

53. The apparatus of claim 1 further comprising boom rotation means coupled to said mast assembly and said boom, for rotating said boom about its longitudinal axis.

54. The apparatus of claim 1 further comprising a bale positioning device for orienting the at least one bale to facilitate the gripping thereof by the bale gripping device, the bale positioning device being disposed to one side of the base.

55. The apparatus of claim 54 wherein the bale positioning device includes:
a support carried at a height above the base, upon which at least one bale may be placed, and
at least one guardrail mounted to the support against which at least one bale may be urged to abut.

56. The apparatus of claim 54 wherein the bale positioning device is pivotally mounted to the tank.

57. The apparatus of claim 55 wherein the bale positioning device is moveable between an in-use position and an out-of use position; when in the use-position, the bale positioning device is disposed at a fixed location relative to the base.

58. An apparatus for moistening and handling at least one bale, comprising:
an open-topped tank for containing a liquid for moistening the at least one bale;
a base;
a mast assembly extending upwardly from said base, said mast assembly being rotatable about its longitudinal axis;
a boom carried by said mast assembly, said boom being moveable between a lowered position and a raised position relative to said base; and
a bale gripping device depending from said boom, said bale gripping device including a bale guide for maintaining the at least one bale engaged in a submerged position within said tank to facilitate moistening of the at least one bale; said bale guide being fixedly mounted to, and depending downwardly from said boom.

59. An apparatus for moistening and handling at least one bale, comprising:
an open-topped tank for containing a liquid for moistening the at least one bale;
a base;
a mast assembly extending upwardly from said base;
a boom carried by said mast assembly, said boom being rotatable about said mast assembly, said boom being moveable between a lowered position and a raised position relative to said base and said boom having a longitudinal axis; and
a bale gripping device depending from said boom, said bale gripping device including a bale guide for maintaining the at least one bale engaged in a submerged position within said tank to facilitate moistening of the at least one bale; said bale guide being moveable relative to said boom and being adapted to travel longitudinally along said boom.

60. A method of handling and moistening at least one bale, comprising:
providing a base, a mast assembly extending upwardly from the base, a boom carried by the mast assembly and a bale gripping device depending from the boom; the boom having a longitudinal axis; the bale gripping device including a pair of gripping members and a bale guide; the bale guide being disposed between the pair of gripping members; the bale guide being moveable relative to the boom and being adapted to travel longitudinally along the boom;
providing an open-topped tank for containing a liquid for moistening the at least one bale;
gripping the at least one bale located at a first position, between the pair of gripping members;
moving the boom along the longitudinal axis of the mast assembly to alternatively raise or lower the at least one bale relative to said base;
urging rotation of the boom about the longitudinal axis of the mast assembly to move the at least one bale from the first position to a second position located above the open-topped tank;
lowering the at least one bale into the open-topped tank;
maintaining the at least one bale submerged in the tank with the bale guide;
removing the at least one bale from the open-topped tank.

61. The method of claim 60 wherein:
the at least one bale is generally rectangular and has a plurality of sides; and
gripping the at least one bale includes urging the bale gripping device to abut at least three sides of the at least one bale.

62. The method of claim 60 wherein gripping the at least one bale includes urging the bale guide to abut the top of the at least one bale.

63. The method of claim 62 wherein gripping the at least one bale further includes actuating at least one of the gripping members to grippingly engage the at least one bale.

64. The method of claim 63 wherein the gripping the at least one bale includes actuating both gripping members simultaneously to grippingly engage the at least one bale.

65. The method of claim 64 wherein:
one of the gripping members is adapted to travel longitudinally relative to the boom; and
actuating both gripping members includes urging said one of the gripping members to travel longitudinally relative to the boom toward the at least one bale.

66. The method of claim 65 wherein:
the other of the gripping members is adapted to pivot about boom; and
actuating both gripping members includes urging said other of the gripping members to pivot about said boom toward the at least one bale.

67. The method of claim 60 wherein lowering the at least one bale includes moving the boom along the longitudinal axis of the mast assembly toward the base.

68. The method of claim 60 wherein removing at least one the bale includes raising the at least bale over the open-topped tank to allow the excess liquid to drain from the at least one bale into the open-topped tank.

69. The method of claim 68 wherein raising the at least one bale includes moving the boom along the longitudinal axis of the mast assembly away from the base.

70. The method of claim 69 further comprising moving the at least one bale to a third position after removing the at least one bale from the open-topped tank.

71. The method of claim 70 wherein moving the at least one bale includes:
   urging rotation of the boom about the longitudinal axis of the mast assembly;
   lowering boom; and
   placing the at least one bale onto a load bearing surface for transport.

72. The method of claim 60 further comprising:
   providing a bale positioning device; and
   prior to gripping the at least one bale, placing the at least one bale onto the bale positioning device to orient the at least one bale to facilitate the gripping thereof.

73. The method of claim 72 wherein:
   the bale positioning device includes at least one guardrail; and
   placing the at least one bale includes urging at least one of the sides of the bale to abut the guardrail for proper orientation.

* * * * *

UNITED STATES PATENT AND TRADEMARK OFFICE
CERTIFICATE OF CORRECTION

PATENT NO. : 7,520,213 B2 Page 1 of 1
APPLICATION NO. : 11/000933
DATED : April 21, 2009
INVENTOR(S) : Robert James Wilson and William Charles Cecil Upshall It is certified that error appears in the above-identified patent and that said Letters Patent is hereby corrected as shown below:

Column 23, line 4 and 5: Replace "removing at least one the bale includes raising the at least bale" with --removing the at least one bale includes raising the at least one bale--.

Signed and Sealed this

Twenty-first Day of July, 2009

JOHN DOLL
*Acting Director of the United States Patent and Trademark Office*